United States Patent
Dehlsen et al.

(10) Patent No.: US 9,080,548 B2
(45) Date of Patent: Jul. 14, 2015

(54) METHOD OF CONTROLLING DEPTH OF A BUOYANT SUBMERSIBLE APPARATUS IN A FLUID FLOW

(71) Applicant: Aquantis, Inc., Santa Barbara, CA (US)

(72) Inventors: James G. P. Dehlsen, Santa Barbara, CA (US); James B. Dehlsen, Santa Barbara, CA (US); Alexander Fleming, San Francisco, CA (US)

(73) Assignee: Aquantis, Inc., Santa Barbara, CA (US)

( * ) Notice: Subject to any disclaimer, the term of this patent is extended or adjusted under 35 U.S.C. 154(b) by 0 days.

(21) Appl. No.: 14/320,429

(22) Filed: Jun. 30, 2014

(65) Prior Publication Data

US 2015/0021919 A1    Jan. 22, 2015

Related U.S. Application Data

(62) Division of application No. 13/454,059, filed on Apr. 23, 2012, now Pat. No. 8,766,466.

(60) Provisional application No. 61/628,518, filed on Oct. 31, 2011.

(51) Int. Cl.

| | |
|---|---|
| *F03B 13/10* | (2006.01) |
| *F03B 3/04* | (2006.01) |
| *F03B 17/06* | (2006.01) |
| *B63B 21/26* | (2006.01) |
| *B63B 21/50* | (2006.01) |

(Continued)

(52) U.S. Cl.
CPC . *F03B 3/04* (2013.01); *B63B 21/26* (2013.01); *B63B 21/50* (2013.01); *B63B 22/02* (2013.01); *B63G 8/22* (2013.01); *F03B 13/105* (2013.01); *F03B 17/061* (2013.01); *F05B 2240/97* (2013.01); *F05B 2260/406* (2013.01); *F05B 2260/902* (2013.01); *F05B 2270/18* (2013.01); *Y02E 10/28* (2013.01); *Y02E 10/38* (2013.01)

(58) Field of Classification Search
CPC ........ B63B 21/26; B63B 21/50; B63B 22/02; B63G 8/22; F03B 13/105; F03B 17/061; F03B 3/04; F05B 2240/97; F05B 2260/406; F05B 2260/902; F05B 2270/18; Y02E 10/28; Y02E 10/38

See application file for complete search history.

(56) References Cited

U.S. PATENT DOCUMENTS

| | | |
|---|---|---|
| 2,501,696 A | 3/1950 | Souczek |
| 4,383,182 A | 5/1983 | Bowley |

(Continued)

*Primary Examiner* — Tulsidas C Patel
*Assistant Examiner* — S. Mikailoff
(74) *Attorney, Agent, or Firm* — San Diego IP Law Group LLP

(57) ABSTRACT

An underwater apparatus for generating electric power from ocean currents and deep water tides. A submersible platform including two or more power pods, each having a rotor with fixed-pitch blades, with drivetrains housed in pressure vessels that are connected by a transverse structure providing buoyancy, which can be a wing depressor, hydrofoil, truss, or faired tube. The platform is connected to anchors on the seafloor by forward mooring lines and a vertical mooring line that restricts the depth of the device in the water column. The platform operates using passive, rather than active, depth control. The wing depressor, along with rotor drag loads, ensures the platform seeks the desired operational current velocity. The rotors are directly coupled to a hydraulic pump that drives at least one constant-speed hydraulic-motor generator set and enables hydraulic braking. A fluidic bearing decouples non-torque rotor loads to the main shaft driving the hydraulic pumps.

6 Claims, 23 Drawing Sheets

(51) Int. Cl.
*B63B 22/02* (2006.01)
*B63G 8/22* (2006.01)

(56) References Cited

U.S. PATENT DOCUMENTS

| | | | |
|---|---|---|---|
| 4,864,152 A | 9/1989 | Pedersen | |
| 6,091,161 A | 7/2000 | Dehlsen et al. | |
| 6,168,373 B1 | 1/2001 | Vauthier | |
| 6,531,788 B2 | 3/2003 | Robson | |
| 6,923,622 B1 | 8/2005 | Dehlsen | |
| 7,199,484 B2 | 4/2007 | Brashears | |
| 7,331,762 B2 | 2/2008 | Fraenkel | |
| 7,441,988 B2 * | 10/2008 | Manchester | 405/75 |
| 7,530,224 B2 | 5/2009 | Fraenkel | |
| 7,541,688 B2 | 6/2009 | Mackie | |
| 7,682,126 B2 | 3/2010 | Parker | |
| 7,737,570 B2 * | 6/2010 | Costin | 290/43 |
| 8,102,071 B2 | 1/2012 | Catlin | |
| 2002/0051586 A1 | 5/2002 | Orndorff, Jr. et al. | |
| 2007/0227135 A1 | 10/2007 | Khalil | |
| 2010/0164230 A1 * | 7/2010 | Belinsky et al. | 290/54 |
| 2010/0181774 A1 | 7/2010 | Dehlsen et al. | |
| 2010/0320770 A1 | 12/2010 | Dahlhaug | |
| 2010/0327583 A1 | 12/2010 | Hunt | |
| 2011/0031760 A1 | 2/2011 | Lugg | |
| 2011/0131970 A1 * | 6/2011 | Johnston et al. | 60/497 |
| 2011/0241347 A1 * | 10/2011 | Boureau et al. | 290/53 |
| 2013/0106105 A1 * | 5/2013 | Dehlsen et al. | 290/43 |

* cited by examiner

METHOD OF CONTROLLING DEPTH OF A BUOYANT SUBMERSIBLE APPARATUS IN A FLUID FLOW

CROSS-REFERENCE TO RELATED APPLICATIONS

This application is a divisional of U.S. Pat. No. 8,766,466 (U.S. application Ser. No. 13/454,059) to issue on Jul. 1, 2014, entitled "Multi-Megawatt Ocean Current Energy Extraction Device" filed on Apr. 23, 2012, which claims the benefit of U.S. Provisional Application No. 61/628,518, filed on Oct. 31, 2011, the disclosures of which are incorporated by reference in their entirety.

BACKGROUND OF THE INVENTION

1. Field of the Invention

This invention relates to hydroelectric power-generating devices that use underwater currents to drive electricity-generating rotor assemblies.

2. Description of the Prior Art

The use of underwater power generators for generating electricity from water current flow, such as rivers and oceans, is known in the art. There are two types of prior art ocean devices: stationary turbines and tethered turbines. Stationary turbines are comprised of stationary towers based on the ocean floor. Electricity-generating turbines are mounted on the towers at a fixed depth, with rotor blades facing the flow upstream or downstream of the tower. This type of design has several disadvantages: higher underwater construction costs; the engineering challenges related to installing towers in deep water; reduced current velocity close to the ocean floor resulting in lower power output; and maintenance of underwater systems.

Tethered devices that are anchored to the ocean floor are designed to operate underwater. In some cases, a wing (hydrofoil) provides lift, and/or ballast tanks provide buoyancy in order to keep the devices from descending. Some devices use a buoyancy chamber to regulate their overall buoyancy, thereby adjusting their operating depths in a current stream. Other devices add movable surfaces that serve as an elevator to control the depth of the device. The elevator surface is adjusted to assist the device to dive or ascend, as needed.

By using both local marine current measurements with known global current patterns, a number of sites in the ocean have been identified for deployment of marine current generating devices, representing several thousand gigawatts of potential generation. Many countries throughout the world rely heavily on importing fuel for generating electricity, and they lack other viable renewable energy sources. In view of current population growth (increasing by 1.5 million humans per week), a perilous trend in climate change, growing demand for natural gas and petroleum, and the increasing difficulty in finding and developing new petroleum fields, creates an urgency for developing and deploying new sustainable and cost-effective technologies to transition energy resources and consumption away from carbon-based fossil fuels.

Most marine current generation technologies are migrating to the use of submerged systems. Energy can be extracted from the ocean using submerged turbines that are similar in function to wind turbines, converting energy through the process of hydrodynamic rather than aerodynamic lift or drag. These turbines have rotor blades, generators for converting rotational power into electricity, and means for transmitting the electrical current generated to the shore-based electrical grid.

Today, both horizontal and vertical axis turbines are generally considered for producing power from ocean currents. Ocean current power systems are at an early stage of development; only a few prototypes of small scale and a few demonstration units having been tested or shown to date and most devices are below a 2 MW generating capacity rating.

Numerous patents have been issued related to systems for producing energy from ocean currents. Some of the patents describe devices using active stability, depth and rotor control, which increases cost and reduces reliability.

Prior art designs describe complex active systems such as control surfaces, variable ballast, variable pitch, winching systems, or mechanical means for raising/lowering the structure. In a moored system with harsh environmental and structural loading from ocean tidal currents, gyres (steady ocean currents), and eddies, failures from these control methods could result in the inability to access the device, or, in the worst cases, complete loss of the structure, or hazard to navigation for vessels using the area. In addition to the inherent risks, these controls lack simplicity; they provide many variables and opportunities for failure, along with the additional costs associated with these types of control methods. Lower reliability, lower operating availability for power production, and higher maintenance requirements mean that the designs shown in the prior art are not cost-effective.

To satisfy customer needs, hydrokinetic devices must provide a low cost of energy, high reliability and high operating availability to the grid, and they should have a service life greater than 20 years and a high safety factor in operation and maintenance. Maintenance costs for offshore structures require a significantly different mindset than that for onshore power plants. For example, accessing the mechanical components of submerged systems can require specialized crews, divers, autonomous underwater vehicles (AUV's), Remotely Operated Vehicles (ROV's), vessel costs for mobilization and demobilization, and related fuel costs. To be comparable to other power-generating technologies on a cost-of-energy basis, the scheduled visits to perform maintenance should be on the order of five years. Servicing should be on the ocean surface to minimize risks to the operating crews. Sub-systems must, therefore, be simple and reliable, and they should use proven components to achieve low cost-of-energy targets.

It is therefore desirable to take a systematic approach to provide a simple and reliable system, one that is easy to maintain and service, with low cost-of-energy (COE) and a service life longer than 20 years.

What is needed is a simplified, tethered, underwater, current-driven rotor assembly coupled to a power-generating system, which, in a cost-effective manner, passively adjusts to varying ocean currents to limit structural loads without active control surfaces, with minimal effect on stability, safety, and power-generating performance.

In order to reduce installation and maintenance costs, use of underwater structures and moving parts should be minimized. A method of safely and economically mooring and installing the underwater device in its operational position should be provided, along with a procedure to safely bring the device to the surface for maintenance or for replacement of components. Variable blade pitch should be eliminated to reduce the potential of pitch system failure and other maintenance issues. Complete emergency shutdown of the device, including stopping rotor blade rotation, should be possible, and the device should have fail safe depth control which prevents unplanned surfacing.

SUMMARY OF THE INVENTION

In accordance with the present invention, an apparatus for underwater power-generation is provided in which a submersible device, or platform, includes sets of two or more counter-rotating rotor assemblies, each rotor assembly having rotor blades, preferably of fixed pitch. The current-driven rotor assemblies drive hydraulic pumps which, in turn, drive fixed and variable displacement hydraulic motors to drive, preferably at constant speed, electric generators that are all housed in a fluid-tight power pod. The power pods are connected together by a transverse structure, which can be a wing depressor built in the shape of a hydrofoil, a truss, or a faired tube. The submersible device is connected to one or more anchors on the seabed by forward tethers. The device is also connected to an additional anchor on the seabed by a vertical downward tether to limit the submersible device to a desired depth, to prevent unplanned surfacing, and to counteract buoyancy. The vertical current shear has lower velocity as depth increases. A wing depressor generates negative lift to offset buoyancy and ensures that the submersible device seeks/dives down to the desired operational current speed along the vertical shear, which corresponds to a specific depth. The same effect can be accomplished with a truss or faired tube, in concert with dominating rotor drag loads. As the flow velocity varies above operational speed, thereby increasing drag loads, the device dives deeper along the vertical shear until it reaches equilibrium (balance of forces) at the corresponding flow speed.

In accordance with an aspect of the invention, the rotor assemblies have fixed pitch rotor blades.

In accordance with an aspect of the invention, the rotor assemblies drive a hydrostatic or hydraulic drivetrain.

In accordance with an aspect of the invention, a power-generating system is housed in a water tight, buoyant pressure vessel. The power-generating system includes a drive shaft operatively connected to one or more hydraulic pumps, and at least one hydraulic or mechanical brake. The hydraulic pumps are then connected by hydraulic lines to variable or fixed displacement hydraulic motors, which are directly connected to at least one electric generator. In accordance with an aspect of the invention, the main shaft rotates within a fluidic (sea water lubricated) bearing that decouples non-torque loads to and drive at least one hydraulic pump that couples at least one constant-speed hydraulic motor and generator and also enables hydraulic braking.

In accordance with an aspect of the invention, the fluidic bearing prevents non-torque loads from entering sealed areas, thus mitigating leak paths, and a flex coupling in the drive line prevents eccentric loads from acting on the hydraulic pump.

In accordance with an aspect of the invention, the rotor assemblies may be slowed or stopped by hydraulic braking of the pump acting in concert or independent of a mechanical brake for redundancy.

In accordance with an aspect of the invention, the hydraulic brakes use hydraulic pressure to stop the rotor assembly, using energy from a main hydraulic loop that feeds a charged accumulator, which discharges when needed to apply the hydraulic brake to the rotor drive shaft.

In accordance with an aspect of the invention, a method of controlling depth of the device underwater is provided, based on the measured velocity shear profile of the current, which said velocity reduces with depth. Controlling depth comprises:

anchoring the device in respect of the fluid flow by means of forward tethers connected to forward anchors to resist rotor drag loads; and connecting the device to a rear (aft) anchor, which is fixed in a position under the device, so that the rear anchor limits the device to a predetermined depth below the surface, resists buoyancy, and prevents the device from surfacing.

The aft anchor maintains a predetermined depth of the device at the design current velocity, while increased velocity of the current will cause the device to move to greater depths because of increased drag of the device and/or the negative lift of a wing depressor. Similarly, with a decrease in current velocity resulting in a reduction in drag, the device will rise due to its buoyancy until the predetermined depth is reached and the aft tether line goes taut, preventing the device from surfacing.

In accordance with an aspect of the invention, the device is brought to the ocean surface by: (1) braking the rotor assembly to a full stop thereby reducing rotor drag; and (2) releasing the rear mooring line from the platform so that the positively buoyant device will rise to the surface.

The hydraulic direct drive has the advantage of maintenance intervals that are greater than 40,000 hours (5 years). Due to its robustness, the drivetrain requires few service visits and surfacing. In extreme working environments, this translates into a lower life cycle cost of energy. This outweighs the benefits of higher efficiency of drivetrains based on a standard gearbox and variable speed generators; such systems have documented lower reliability, which is exacerbated in the extreme marine environment.

The hydraulic direct drive also has the advantage that, in eliminating failure-prone gearboxes, variable speed generators and power electronics, it also removes the need for inverters and rectifiers. At the same time, eliminating variable speed generators also reduces the risk of dependency on rare earth magnets, with much higher commodity price risk.

The hydraulic braking on the mainshaft has the advantage of eliminating the need for variable pitch rotor blades to mechanically off-load the rotor/drivetrain system when required. The direct hydraulically-activated braking of the rotor assemblies, coupled with a mechanical brake and passive depth control, provides redundancy for protecting against system overloads and enables the use of simple, reliable fixed-pitch rotor blades.

The high power density (kW/kg) of the hydraulic systems compared to the heavier, geared powertrains means less volumetric buoyancy, reducing structural size, body drag, and a need for adding low-density materials such as costly syntactic foam to recover platform buoyancy.

The use of a novel fluidic bearing, flex-coupling, and seals for the main shaft, reduces the number of parts and eliminates the need for a large-diameter main shaft and bearing that require oil lubrication, as well as complex and expensive seals. As a result of the novel fluidic bearing, flex-coupling, and seals, the powertrain is highly reliable, with a long bearing life.

Some prior art patents recommend a dual-rotor system, which could present significant yaw and roll instabilities in a tidal or ocean current environment if one rotor assembly were to rotate at a different rotational speed. It is understood that failure of one of the rotor assemblies would necessitate a shutdown of the device and loss of power generation in a two-rotor system.

A four or more rotor assembly embodiment of the present invention with paired counter-rotating rotor assemblies has the advantage that inequalities with one rotor assembly's rotational speed and torque can be counterbalanced with the opposing counter-rotating rotor assembly to which it is paired. The use of pairs of rotor assemblies, which are adjusted by controls to the hydraulic drive system to match rotational speed and torque, will eliminate device instabilities. The device can continue to supply power even if one rotor assembly has completely stopped rotation, whereby its paired counterpart is also stopped, and the remaining counter-rotating assembly pairs continue to generate power.

As the number of rotor assemblies increases, the unit cost of the moorings and electrical connections decrease. Structural limits for off-the-shelf components for mooring systems, wing/truss structural requirements, and the capacity of vessels used to install the device constitute the limiting factors with regard to the number of rotors that can be incorporated into the submersible device design.

The invention has the further advantage that a centralized mooring attachment allows the device to weathervane or freely pivot into the current direction, reducing the need for active (pitch, roll, and yaw) control of the device. The system relies on the inherent stability of the device in 6 degrees of freedom, and, when subjected to perturbations in the current flow, the device generates the necessary restoring moments for achieving dynamic and static stability. If, for example, a mooring line is lost, the device remains stable and the remaining mooring line supports the tensile-load. Having multiple attachment points would overly constrain the device, and would induce instabilities in the system if the device were subjected to changes in the current direction. The five-degree or greater aft rake (rotor coning) of the rotor blades provides a weather-vaning effect for additional system stability.

At high level flow speeds, the rotor assemblies begin to reach the design limit, at which point most in-stream devices begin to brake or feather the rotor blades by way of variable pitch, much like modern day wind turbines. For tethered devices, the application of the brake to stop the rotor assemblies decreases the drag of the rotor assemblies, resulting in lower tensile forces on the tethers and potential ascent of the device in the water column where even higher flow speeds often exist. Braking the rotor in post-stalled blade states results in momentary spikes in torque loading, the introduction of cavitation, and the introduction of non-linear stability effects. To avoid these issues at high flow regimes, variable ballast control could be used to lower the device to a depth in the water column with lower flow speeds. But as mentioned supra, failure of a ballasting control could result in the loss or sinking of the device. Instead, to deal with current velocities higher than the normal operating regime, a fixed wing with negative incidence angle is employed to passively achieve a descent of the device to more appropriate flow regimes within the water column, eliminating the need for ballasting or control surfaces. Since the flow velocity drops off with increases in depth along a vertical sheer, the device can utilize a wing depressor to drive to deeper depths as a means of load shedding on the rotors. Additionally, the wing depressor provides a means for the device to converge to a desired velocity and rotor torque to avoid overload conditions. This approach also avoids exhaustive water tunnel testing used to characterize the non-linear flow regime with rotor assemblies in the post-stall region, which, at present, computational fluid dynamics models are not able to reliably predict.

To avoid operating at a depth shallower than that prescribed, which may be a navigational hazard, a depth-restricting mooring line is introduced. The concept for the depth-restricting line is to use a vertical line with length equivalent to the distance from the seabed to the desired rotor depth, and a subsea mooring connector that attaches the line to an anchor at the seafloor. To install the device when it is floating on the ocean surface, the forward mooring lines are attached, and a weight is used to bring the buoyant device low enough to achieve slack in the vertical line. An ROV brings the slack vertical line with a male end connector to the female connector, which has been pre-attached to the mud-mat (device used to locate and hold the female location of the ball grab). A mud-mat is used if the anchoring device is an embedment anchor; otherwise the connector may be added directly to the anchor (i.e. a DWT anchor). Alternatively, to install this device, an on-board winch can draw in the depth restricting vertical line, thereby pulling the device down to its operating depth. Ballasting may be used to assist this process.

For servicing, stopping the rotor assemblies by braking results in lower current thrust loading, reducing drag on the device and reducing the downward force vector, whereby buoyancy and release of the vertical mooring cable allows the device to rise to the surface where maintenance can be performed or components of the device can be exchanged for servicing.

The electrical connection of an array of platforms to the grid is made by using one of two methods of transmission: high voltage alternating current (HVAC) or high voltage direct current (HVDC). The distance of the array from shore will determine the method of transmission selected. HVAC will be employed when the platforms are closer to shore and will be achieved using onboard transformers in place of costly subsea transformers to raise the output voltage of the intra-array cables. Intra-array cables from the array of devices will all meet at a common subsea junction box from which subsea transmission cables will carry the power to shore. Synchronization is achieved by speed and phase control of the hydraulic motor generator (HMG), thereby eliminating the power electronics associated with variable speed devices. As transmission distance increases, HVDC can be considered. HVDC comes with higher capital costs due to a more complex electrical system, which includes such items as converters and inverters, and, instead of only needing to raise the voltage of the AC out of the power pods, the voltage will also need to be converted to DC for transmission and then back to AC at onshore substation. Transmission of HVDC also has the benefit of being more efficient (less line loss) than HVAC as distance increases. Depending on the proximity of the power plant to interconnection to the grid, both options will be evaluated.

Synchronization of the HMGs for frequency, voltage and phase is accomplished through a PLC (Programmable Logic Controller), such as a Rexroth BODAS Series. This PLC contains a PWM (Pulse Width Modulated) amplifier to control the displacement of the hydraulic motors that are driving the generator. The I/O sensors for temperature/pressure and speed are built in. The PLC will be programmed to allow changing the rotor drag loads via a hydraulic brake to allow the platform to perform several stability-related tasks. In the event of operational problems with a rotor assembly or powertrain, the PLC will assist in shutting down the adjacent counter-rotating rotor to balance torque and maintain the stability of the device. Wake fractions from upstream platforms can significantly impact power production of downstream devices. By changing the rotor disk loading via the hydraulic brakes, the downstream platforms can change their depth to avoid these wakes to optimize power production. In the event of a severe current gust or eddy, the PLC can assist in regulating the rotor disk loading/rpm to help the device maintain static and dynamic stability in extreme states.

The rotor assembly sets rotate in clockwise and counter clockwise directions to best optimize the balancing of structural loads on the platform. Thus on a two rotor C-Plane the oncoming current would drive the starboard rotor assembly counterclockwise and the port rotor assembly clockwise, with the effect that the center-positioned mooring line reacts against the moments induced by the rotor assemblies rather than if the rotor assembly sets operated in the opposite direction, which would compound with the mooring line loads to accentuate the bending loads on the platform. For C-Planes with more than two rotor assemblies, similar structural design considerations including net buoyancy will be made.

BRIEF DESCRIPTION OF THE DRAWINGS

FIG. 11A depicts installation of the anchors and pull test.

FIG. 11N depicts the platform following completed installation.

DESCRIPTION OF THE PREFERRED EMBODIMENT

The present invention described herein is intended for marine current underwater power generation with passive depth control.

Figure 1:
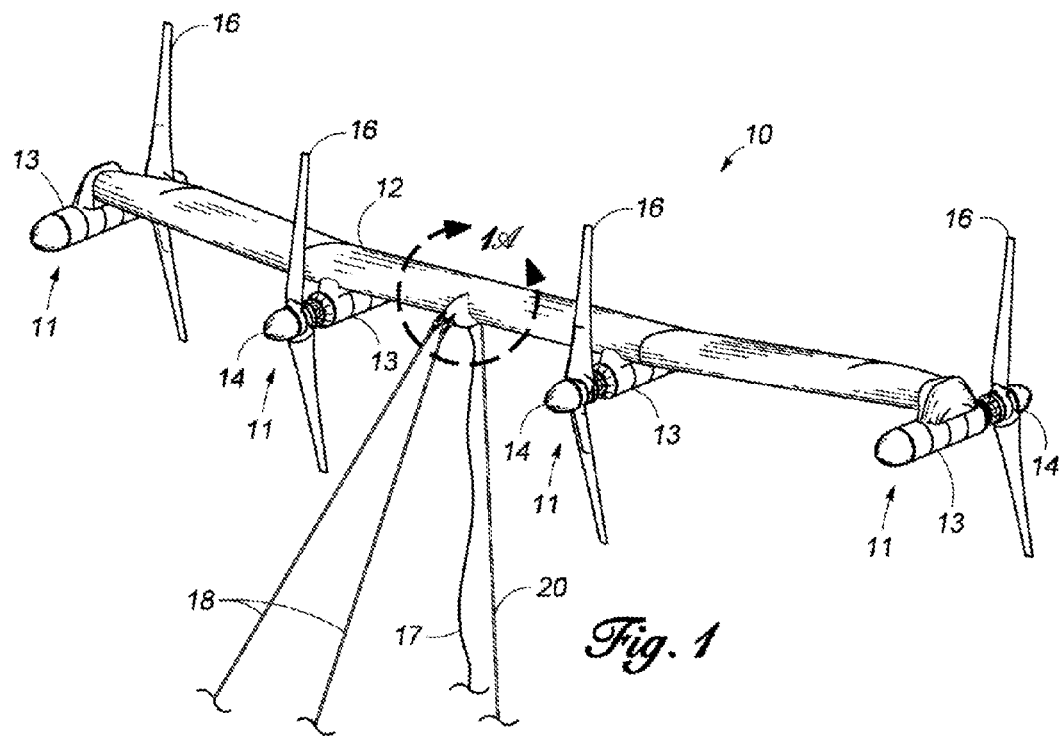
FIG. 1 is a perspective view of an embodiment of the present invention with four power pods, tethered above the seabed.
Figure 1A:
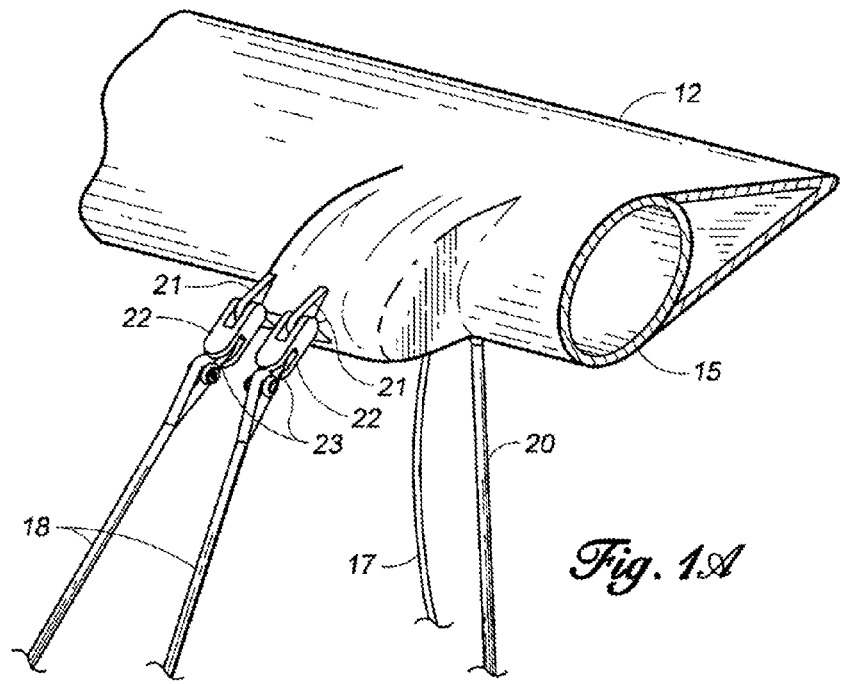
FIG. 1A is a detail view showing the connection of the forward mooring lines to the wing.
Figure 2:
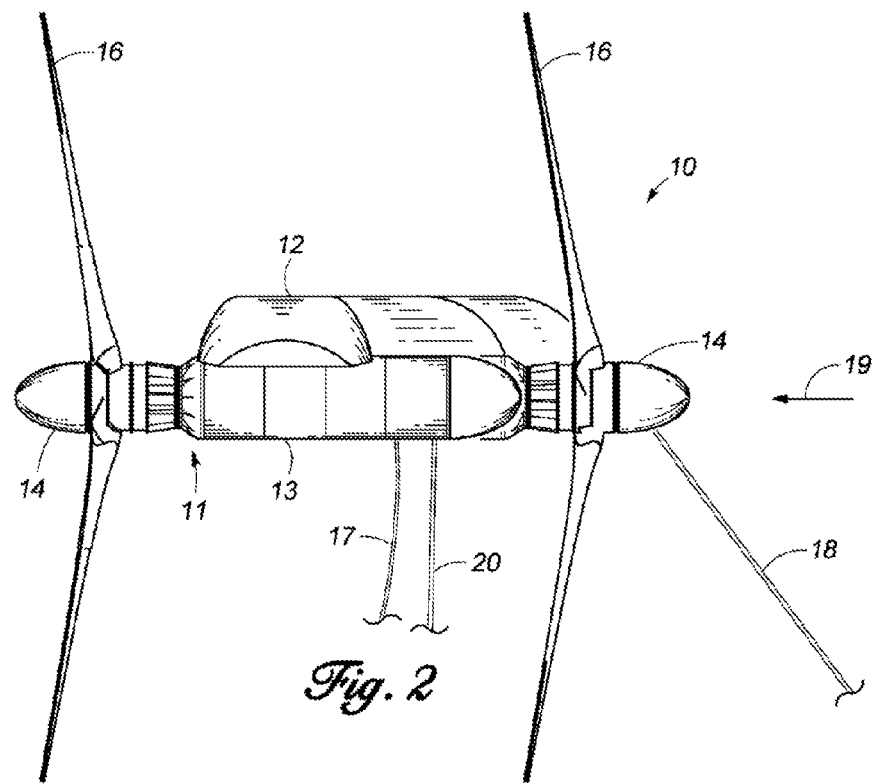
FIG. 2 is a side plan view of the embodiment of the present invention with four power pods.
Figure 3:
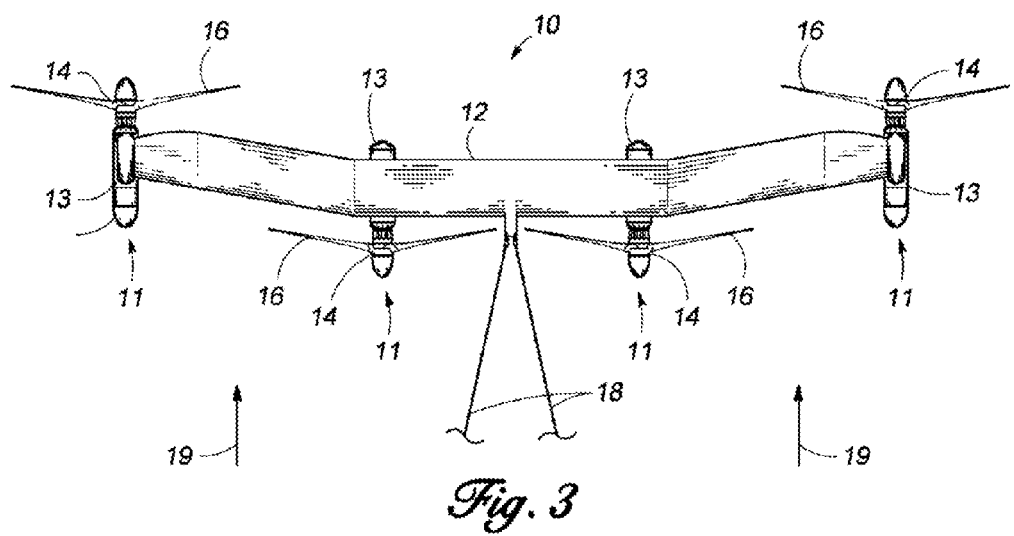
FIG. 3 is a top plan view of the embodiment of the present invention with four power pods.
Figure 7:
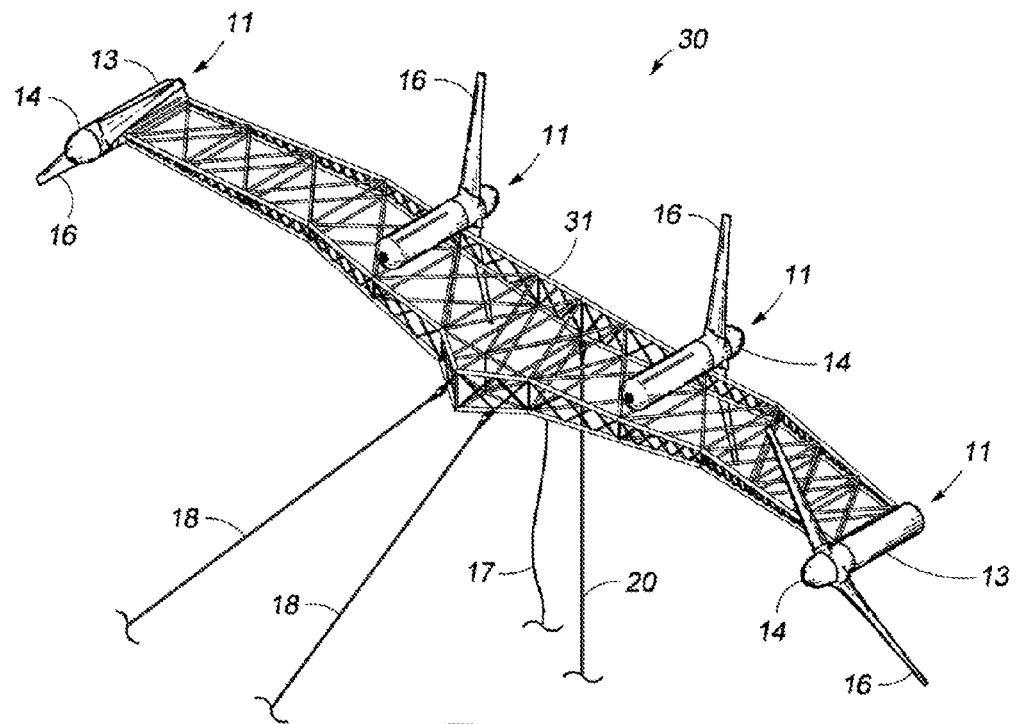
FIG. 7 is a perspective view of an embodiment of the present invention which uses a truss to support the power pods.

FIGS. 1, 2 and 3 illustrate a submersible multi-megawatt power plant that will be referred to as the platform 10. These figures show the platform 10 in a perspective view, a side view, and plan view. This variation of the platform 10 has four power pods 11, each rigidly connected to the transverse structural wing 12. The wing 12 can be formed in a number of ways, depending on design choice, including a faired tube 15, as shown in FIG. 1A, or a truss 31, as shown in FIG. 7, infra. The power pod 11 is comprised of a dry, buoyant pressure vessel 13 (containing a bearing and seal assembly and drivetrain) and a wet rotor assembly 14 with two fixed pitch rotor blades 16. The power pods 11 and structural wing 12 contain all of the equipment necessary for generating and supplying electricity via a riser cable 17 to the electric power collection system for connection to the grid. In operation, the direction of rotation of the rotor blades 16, whether clockwise or counterclockwise, will be constant for each power pod 11.

The platform 10 is depicted with both upstream and downstream rotor assemblies 14. With the majority of the weight of each power pod 11 located near the rotor assembly 14 end of the pressure vessel 13, this arrangement helps to balance the longitudinal separation of the centers of buoyancy and gravity. The platform 10 will rely on the inherent static and dynamic stability of the device.

The platform's 10 movement, which is affected by the current flow 19, will be restricted by two forward mooring lines 18 and one vertical mooring line 20, which are all anchored to the seafloor using one of several types of anchors. The type of anchor used will be dependent on the soil conditions at the installation site. The mooring lines 18, 20 will be sized according to the thrust, buoyancy and drag loads upon platform 10, and they will be fabricated out of polyester. As shown in FIG. 1A, the two forward mooring lines 18 will be attached at separate connection points at the center of the wing 12 to prevent the possibility of a single point of failure. These connection points will have significant structural reinforcement to withstand the mooring line loads. An H-shackle 22 will be connected to a large steel pad eye 21 on the wing 12 to allow freedom of motion for the lines. Following the H-shackle 22, a D-Shackle 23 will connect the mooring line 18 to the wing 12 in order to prevent chafing and wear of the lines. The two forward mooring lines 18 will be spread apart by approximately 30 degrees, each being approximately 15 degrees off centerline.

The embodiment shown in FIGS. 1 though 3 has been described with respect to a fixed wing 12 which not only acts as a structural member but also as a wing depressor that is used for passive depth control. A wing depressor is constructed with a negative angle of attack to the horizontal plane. In response to fluid flow, the wing depressor provides a downward force, to counteract the buoyant force, in order to drive the device deeper in the water column. This enables the device to reach a steady-state equilibrium position where the sum of the vertical forces position the device in the desired velocity flow regime. The purpose of diving deeper is to prevent excess loads on the system and to optimize energy conversion, therefore also maximizing power output. This also prevents fatigue, platform instability and cavitation resulting from non-linear effects that occur from braking at high current speeds. The wing depressor allows a moored platform to vary its depth and maximize power generation and also avoid experiencing both high loads from high current speeds and low power output from low current speeds, and it reduces the need for braking during normal operations. It is understood that the wing depressor and/or the blade pitch could be actuated by active control in response to commands; however, this design would introduce unnecessary complexity and cost into the system.

Figure 4:
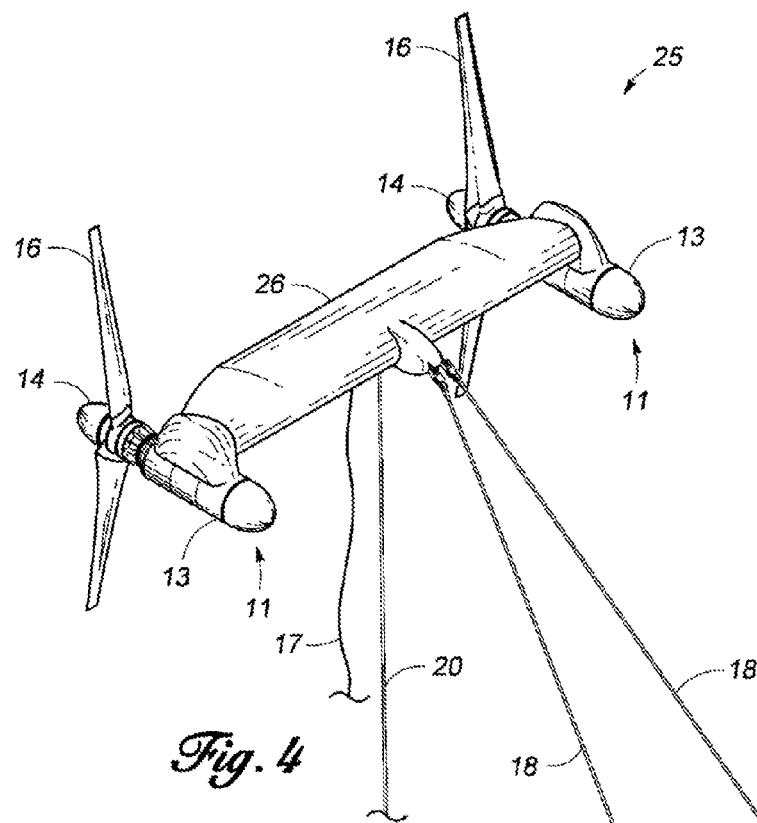
FIG. 4 is a perspective view of the an embodiment of the present invention with two power pods, tethered above the seabed.
Figure 5:
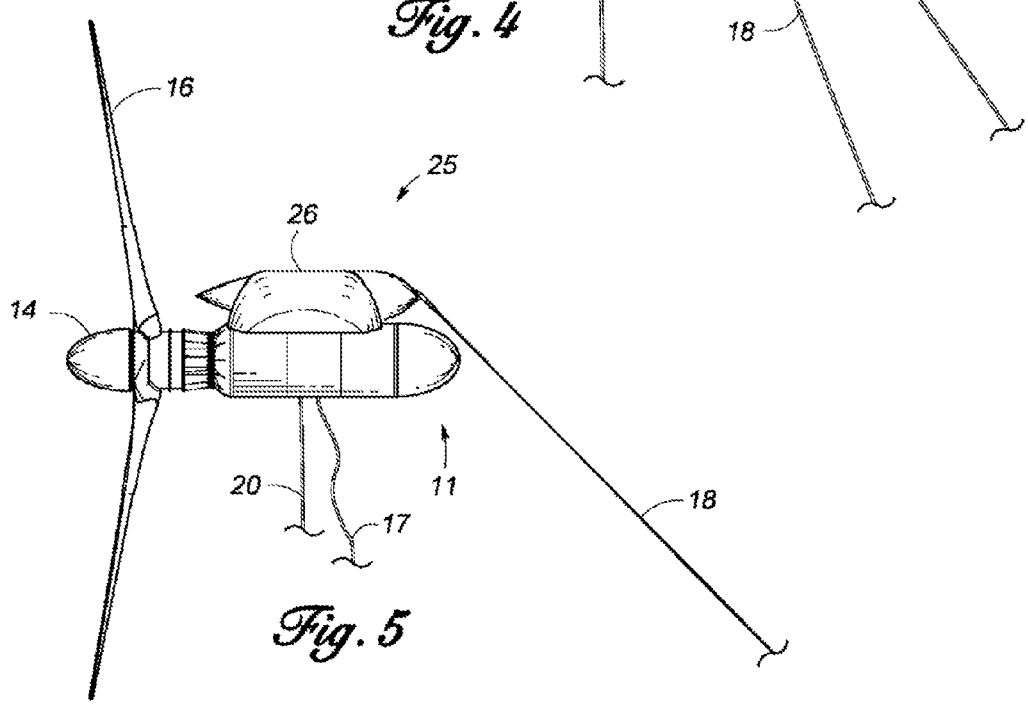
FIG. 5 is a side plan view of the embodiment of the present invention with two power pods.
Figure 6:
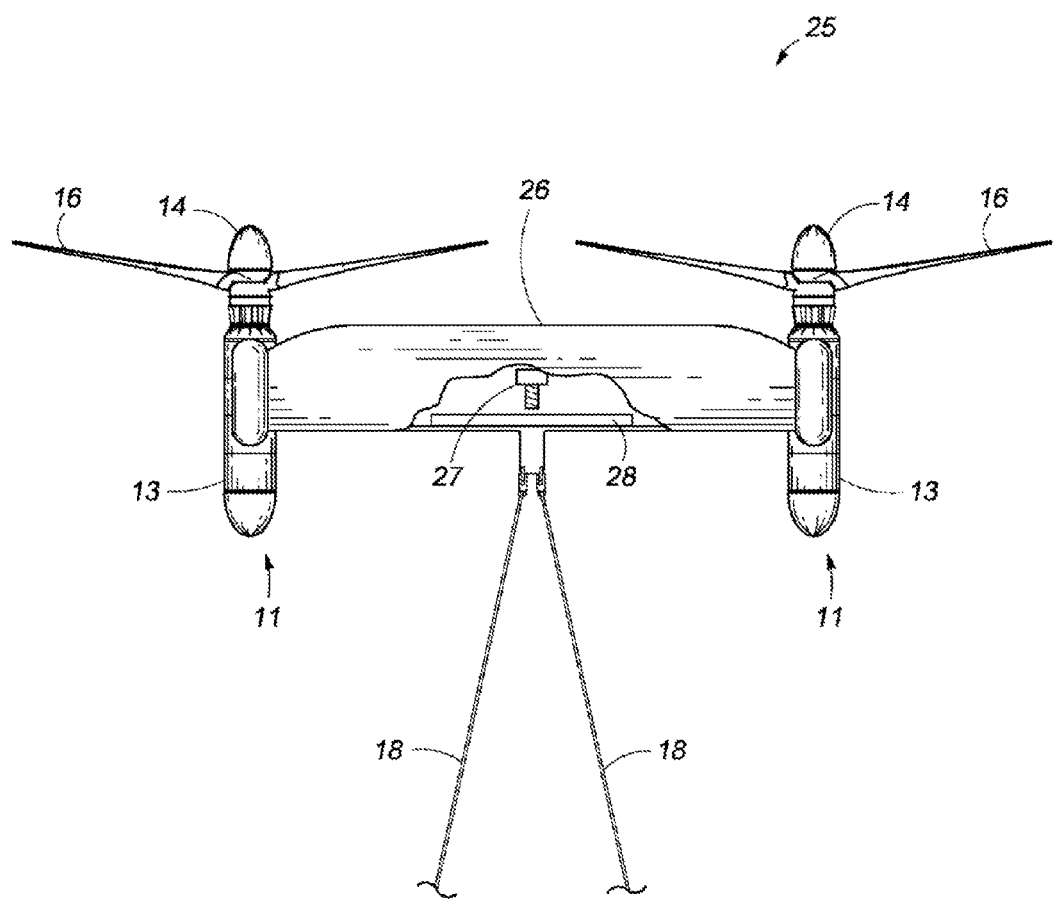
FIG. 6 is a top plan view of the embodiment of the present invention with two power pods.

FIGS. 4, 5, and 6 show perspective, side, and plan views of an alternative platform 25 configuration. They show the platform 25 as a two power pod 11 device. In this configuration each power pod 11 will be comprised of a dry, buoyant pressure vessel 13 (containing a bearing and seal assembly and drivetrain) and a downstream wet bearing rotor assembly 14. Each power pod 11 is rigidly attached to the wing 26. The pitch stability of the platform 25 will be managed by the vertical location of the forward mooring line 18 connection point to the platform. The platform 25 can be equipped with an on-board winch 27 and ballast tank 28, as shown in the cutaway portion.

FIG. 7 depicts a configuration of the platform 30 that utilizes a steel truss 31, which is constructed using welded steel tubes, in place of the structural wing depressor. The truss 31, which will also be buoyant, will serve the same purpose as the wing 12 in that it will be the common structure supporting the power pods 11; however it will function differently than a wing depressor. Instead of a depressor wing passively creating a downward force that drives the platform 30 out of current speeds exceeding the operating limits of the rotor and drivetrain, the drag of the truss 31, working in concert with the dominant rotor drag loads in the high flow scenarios, will drive it deeper to the desired operating current flow velocity. As the drag on the platform 30 increases, the tension in the forward mooring lines 18 will increase and the platform 30 will seek the desired flow at a greater depth. In this embodiment, the power pods 11, each comprising a pressure vessel 13 and a wet bearing rotor assembly 14 are mounted on the top of the truss 31.

Figure 8:
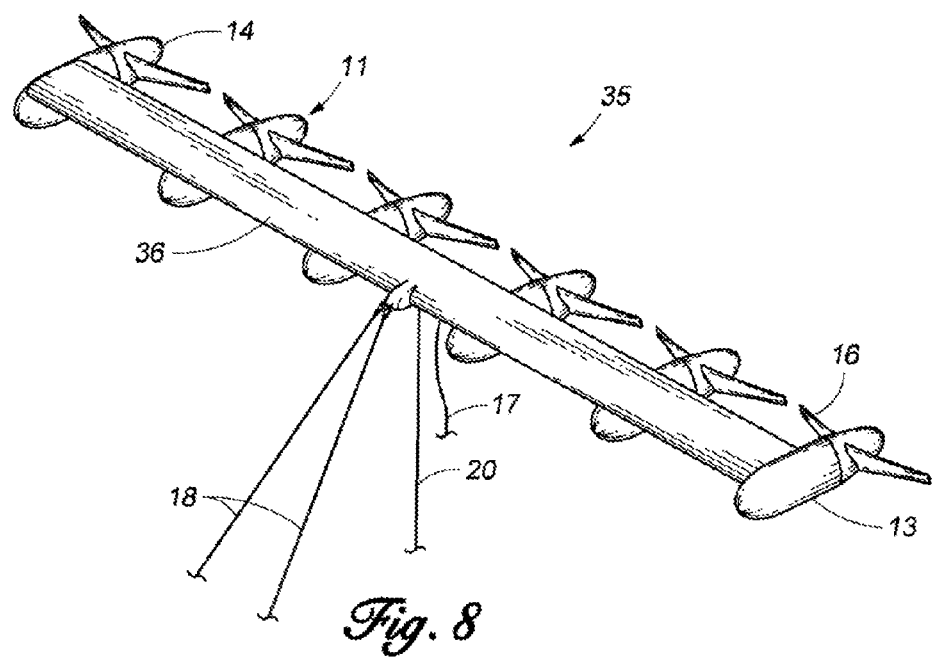
FIG. 8 is a perspective view of an embodiment of the present invention with six power pods.

FIG. 8 depicts an alternate configuration for the platform 35. Six-power pods 11 are rigidly connected to the wing 36. The embodiment shown could be built and installed when greater power requirements are desired. The number of power pods 11 adds redundancy and benefits the operations and maintenance schedule for the platform 35, increasing the availability and reliability of each system should there be a mechanical or electrical failure within one of the power pods 11 that prevents it from generating electricity. In all the embodiments shown, whether two, four, or six power pods are used, the roll stability of the power plant is increased as the span of the wing increases.

Figure 9:
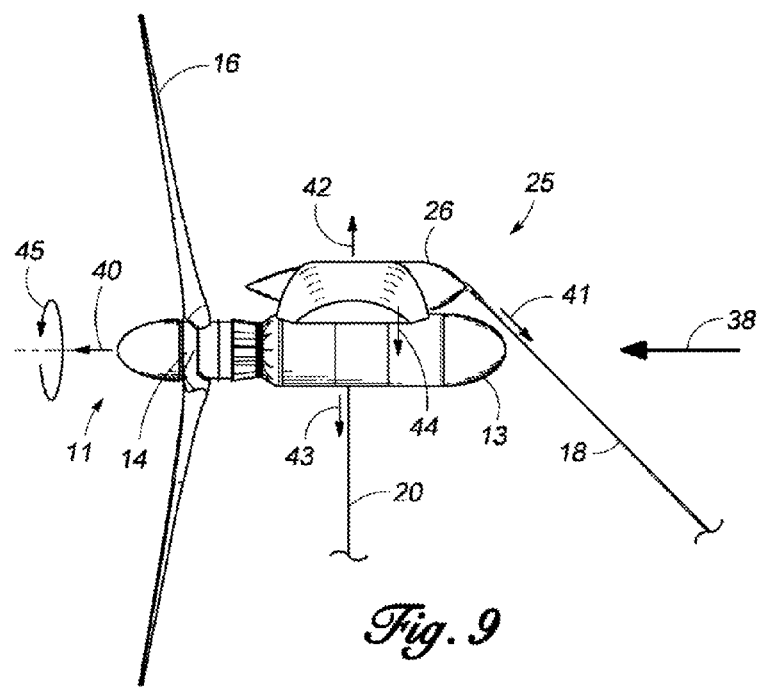
FIG. 9 is a side plan view showing the forces acting on an embodiment of the present invention with two power pods.

While in operation, the platform 10, 25, 30, 35 will experience many different forces. These forces are depicted in FIG. 9, with respect to platform 25. Steady level flight is achieved when all of the forces acting on the platform 25 balance each other out and is designed to occur when the platform 25 is operating at the target flow velocity 38. It is important to note that the forces acting on the platform 25 all act in accordance with one another. The platform drag force 40, a summation of drag forces created by the power pods 11, rotor assemblies 14, and wing 26, is reacted by the forward mooring line tension 41, which prevents the platform 25 from being swept away by the flow. The buoyant force 42, a summation of the buoyancy from the pressure vessels 13 and wing 26, makes the platform 25 rise to the water surface. In a low flow scenario, the vertical mooring line tension 43 prevents it from doing so. In high flow scenarios, that is greater than its design operating velocity, the loads generated the flow on the rotating rotors along with the negative (downward) wing lift 44, drive the platform 25 deeper and prevents it from surfacing. Each rotating rotor assembly 14 creates a torque that would contribute towards the rolling of the platform 25 along its axis in the flow if it were not canceled out. Counter-rotating fixed pitch rotor blades 16 of the paired rotor allow for canceling of the reaction torque 45 while not having a negative effect on the stability of the platform 25.

Figure 10A:
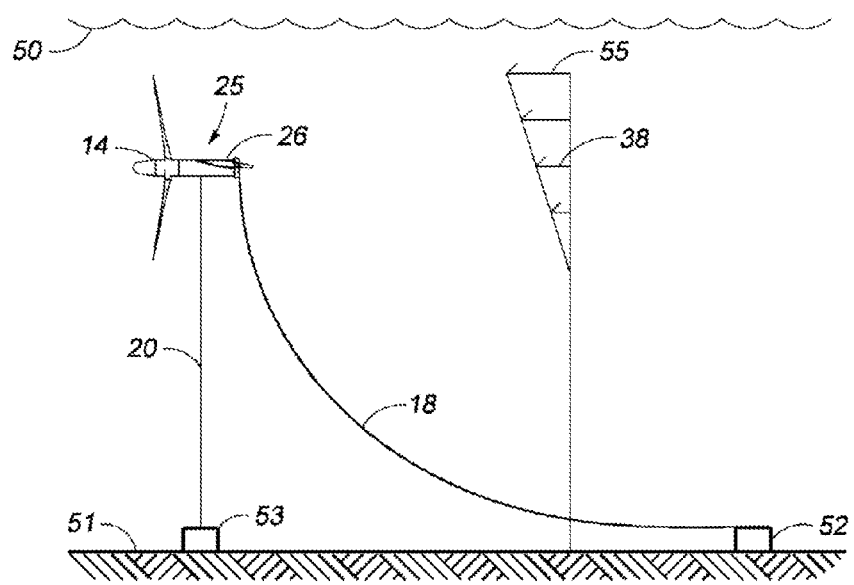
FIGS. 10A through 10C depict the present invention under three separate flow conditions.
Figure 10B:
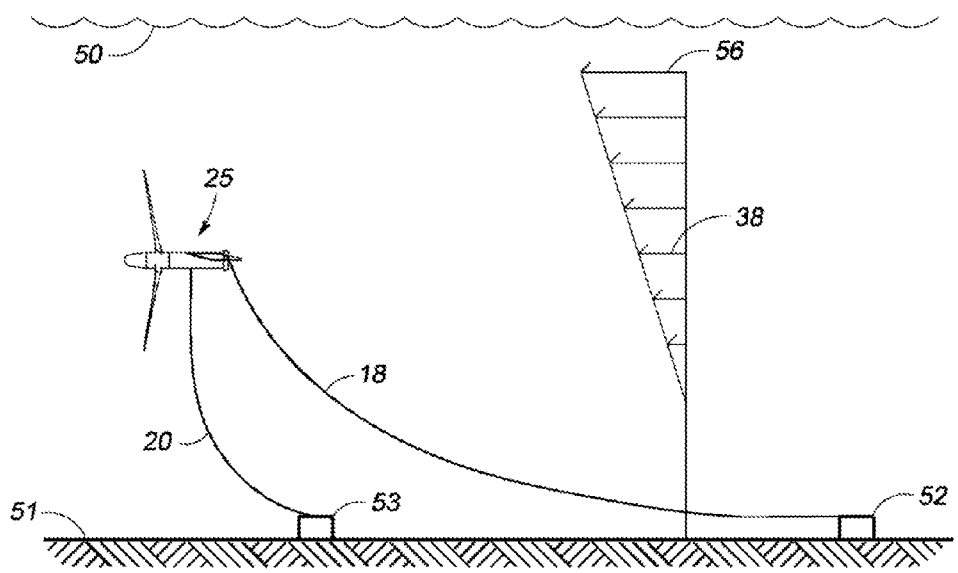
Figure 10C:
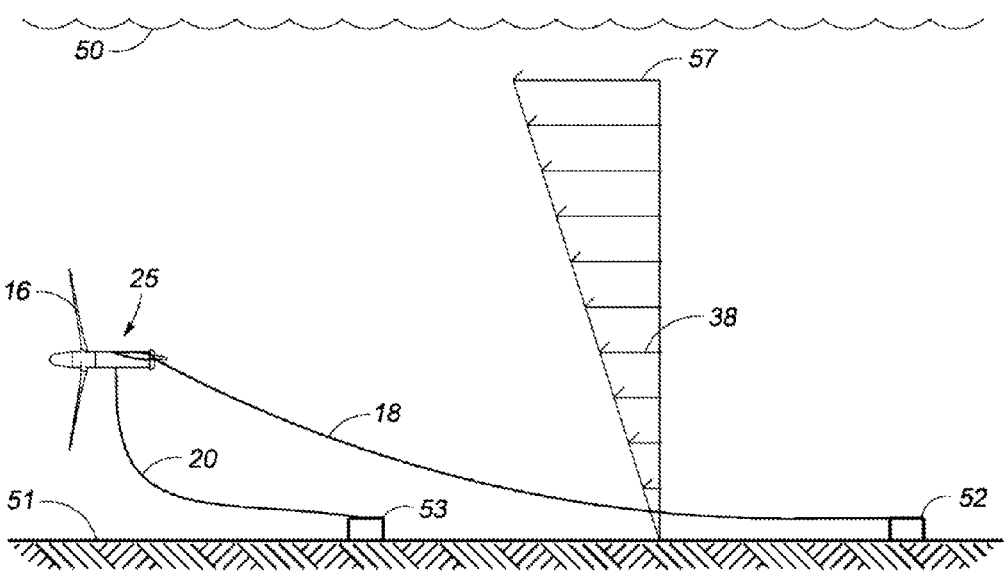

FIGS. 10A, 10B, and 10C depict views of the two power pod platform 25, as it would be anchored to the seabed 51, under three separate flow conditions. From 10A to 10B to 10C, the flow velocity, represented by the arrows, can be seen that at a given depth as it increases from a low flow velocity profile 55 in FIG. 10A, to a normal or design flow velocity profile 56 in FIG. 10B, and finally to a high flow velocity profile 57 in FIG. 10C. During normal operating conditions, the platform 25 seeks steady level flight or equilibrium, which occurs when the platform 25 is operating at the target flow velocity 38. As the flow increases at shallower depths, represented by the arrows of increasing length, the platform 25 will seek a greater depth due to the downward force created as fluid flows over the passive depressor wing 26 along with the drag of the operating rotors. As the flow velocity of the current increases, the platform 25 continually seeks the target flow velocity 38. This passive dive occurs in order to avoid high loads and over speeding of the rotor 14 that will come with higher flow speeds. The productivity advantage is that the platform 25 will be operating at design generating capacity for most of the time, maximizing productivity without overloading the system. The platform 25 will continue to dive until it has obtained the design flow speed resulting in steady level flight.

The forces shown in FIG. 9 depict how the flow velocity affects the platform 25 in the three scenarios of FIG. 10. The buoyant force 42 of the platform 25 is always constant as per the design requirements. In a high velocity profile 57, negative wing lift 44, platform drag 40, and forward mooring line tension 41 all increase. The increase in downward force from negative wing lift 44 along with operating rotor drag load cause the platform 25 to passively dive deeper to seek a state of equilibrium. In a low flow velocity profile 55, the vertical mooring line 43 will be in full design tension and the negative wing lift 44 decreases. With this profile, the buoyant force 42 of the platform 25 will exceed the downward negative wing lift 44 acting on the platform 25 and will cause the platform 25 to rise closer to the water's surface 50. The platform 25 will never be able to reach the water's surface 50 while in service due to the restrictive vertical mooring line 20. When maintenance on the platform 25 must be performed, the rotors 14 will be stopped, creating a significant drop in platform drag 40. When the platform 25 has risen to the extent of the vertical mooring line 20, it can be disconnected and will then float to the water's surface 50 for access. Surfacing may also be accomplished with the release of vertical mooring line winch 27 on-board the platform. In this embodiment, resubmerging from the ocean surface is accomplished by the on-board winch 27 hauling the platform to its minimum operating depth and this operation may be assisted by use of ballast 28.

Figure 11A:
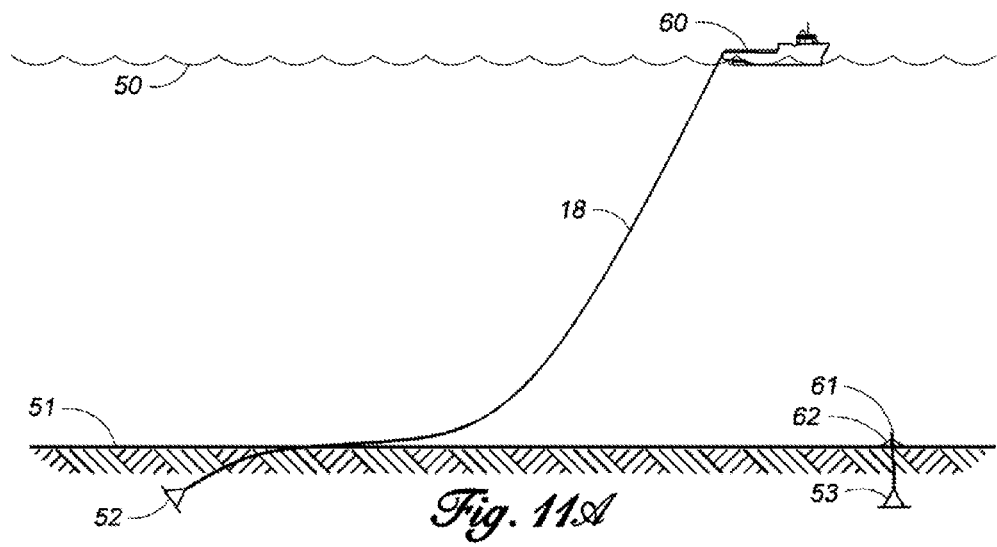
FIGS. 11A through 11N show a sequence of plan views depicting the process for installing the present invention.
Figure 11B:
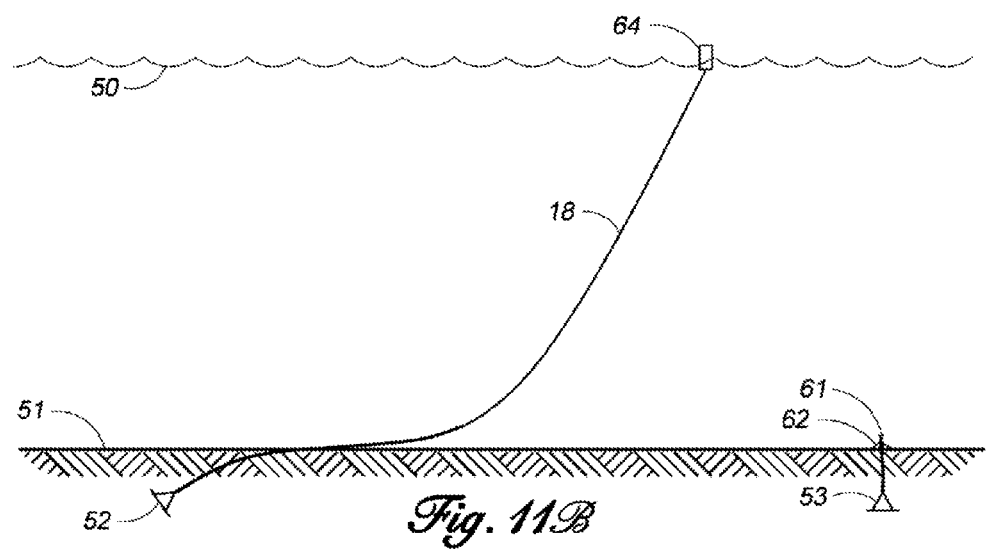
FIG. 11B depicts mooring lines buoyed off to temporary floats.
Figure 11C:
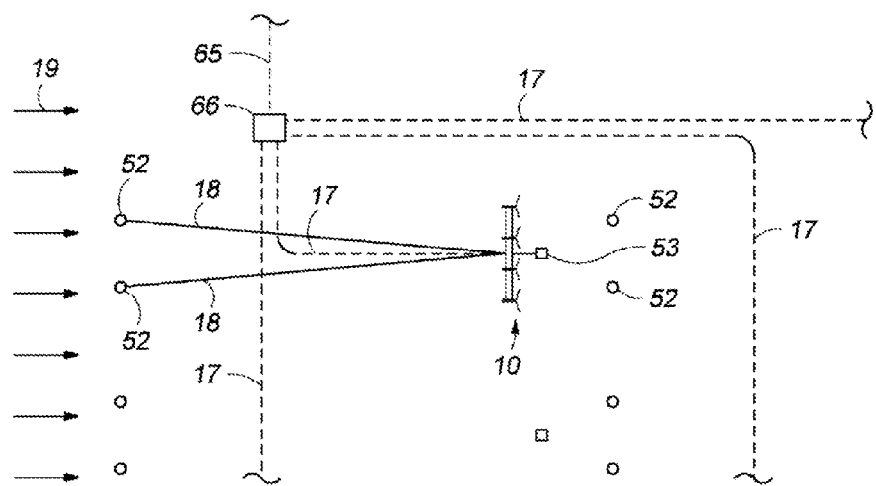
FIG. 11C depicts the installed electric power collection system for connection to the device.
Figure 11D:
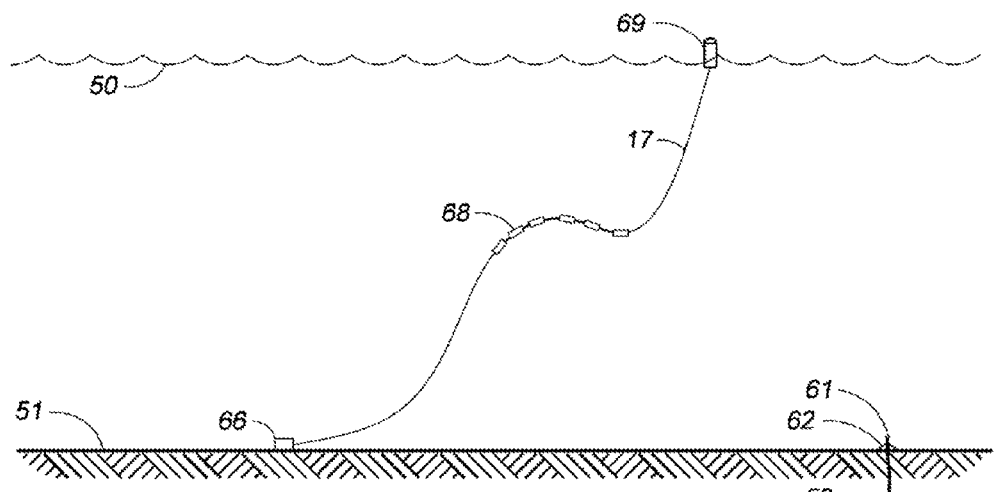
FIG. 11D depicts intra-array cables buoyed off to temporary floats.
Figure 11E:
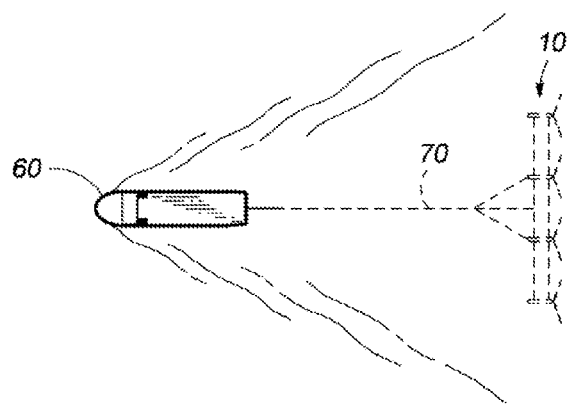
FIG. 11E depicts a tug towing the platform to the site.
Figure 11F:
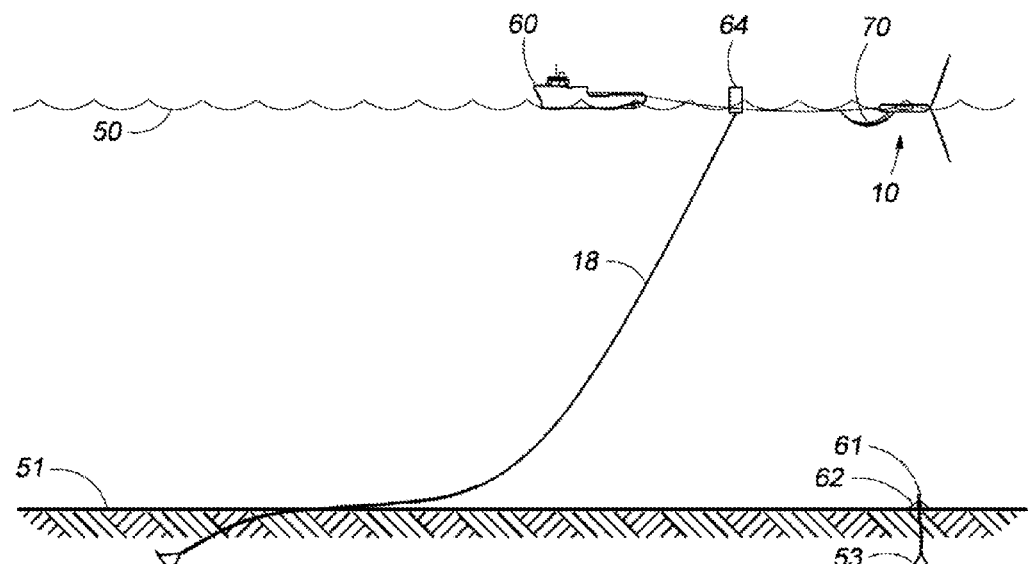
FIG. 11F depicts the platform at the installation site with retrieval of mooring lines.
Figure 11G:
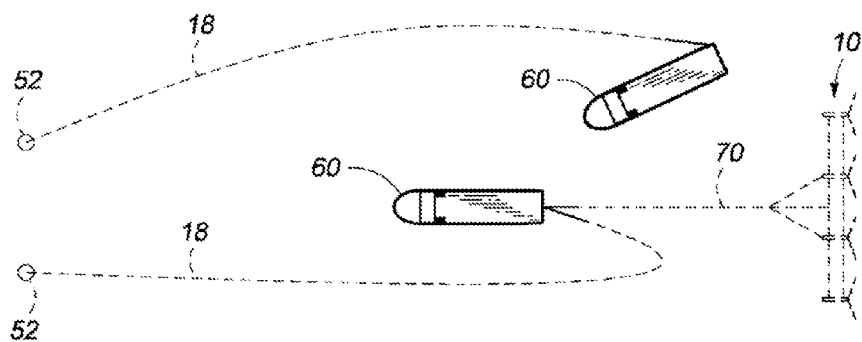
FIG. 11G depicts the recovery of mooring lines by the tugs and transfer to the installation vessel.
Figure 11H:
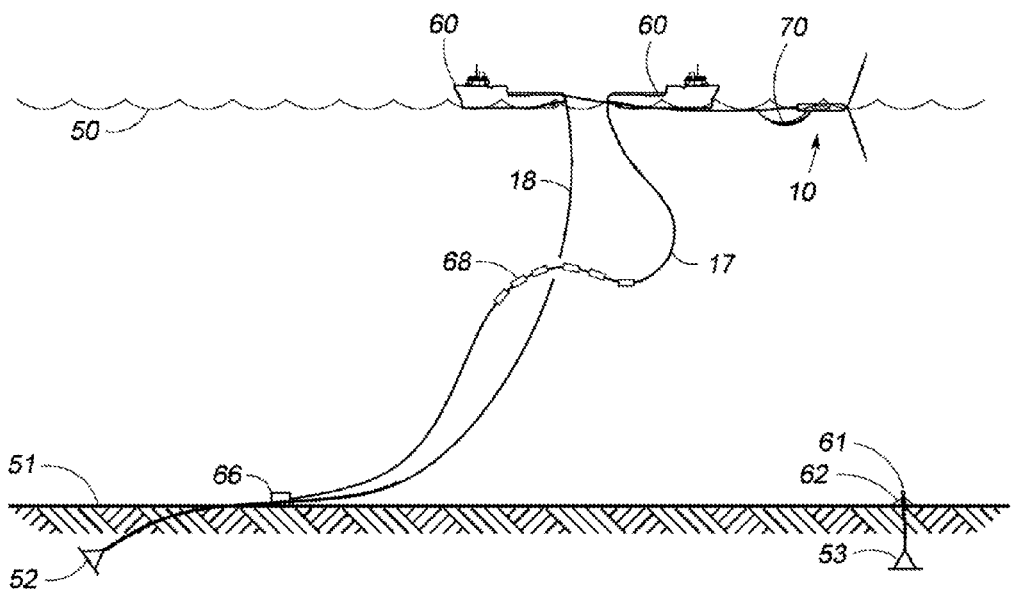
FIG. 11H depicts the recovery of the intra-array power collection cable by tugs.
Figure 11I:
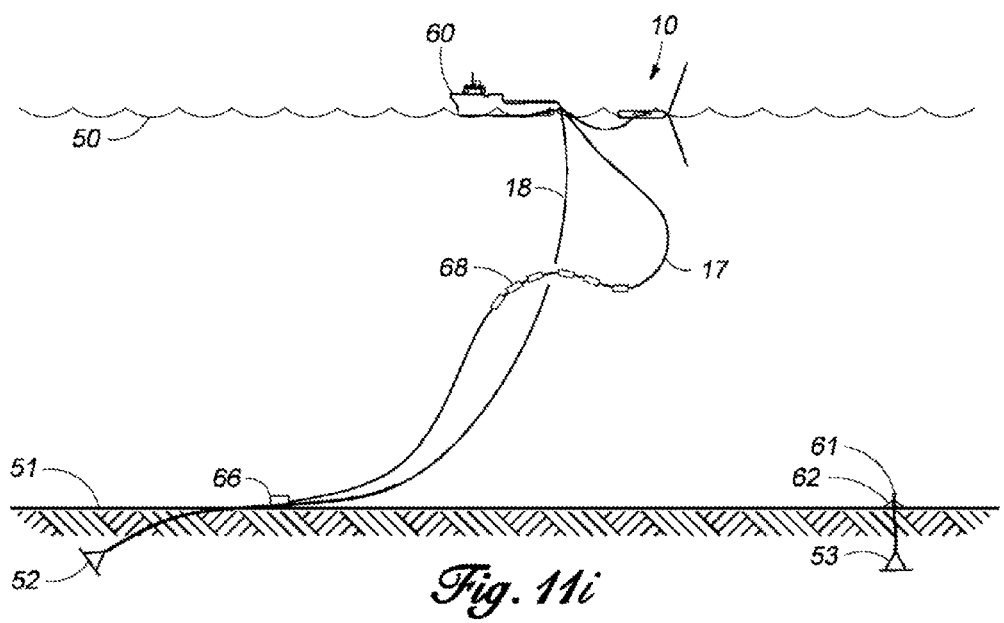
FIG. 11I depicts the connection of the mooring lines and the intra-array power collection cable to the platform.
Figure 11J:
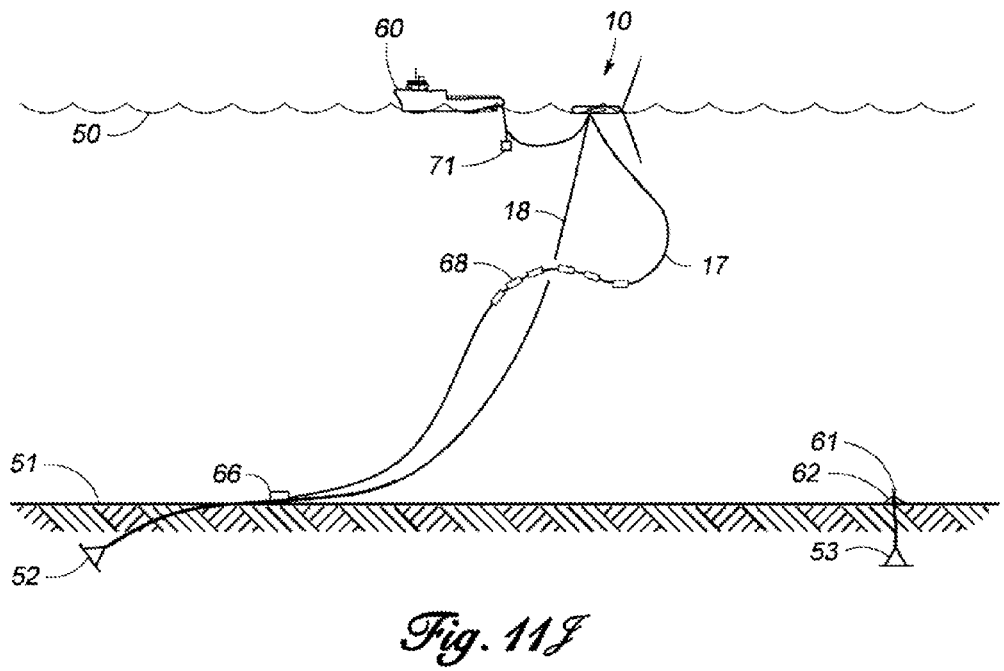
FIG. 11J depicts the deployment of the lowering weight.
Figure 11K:
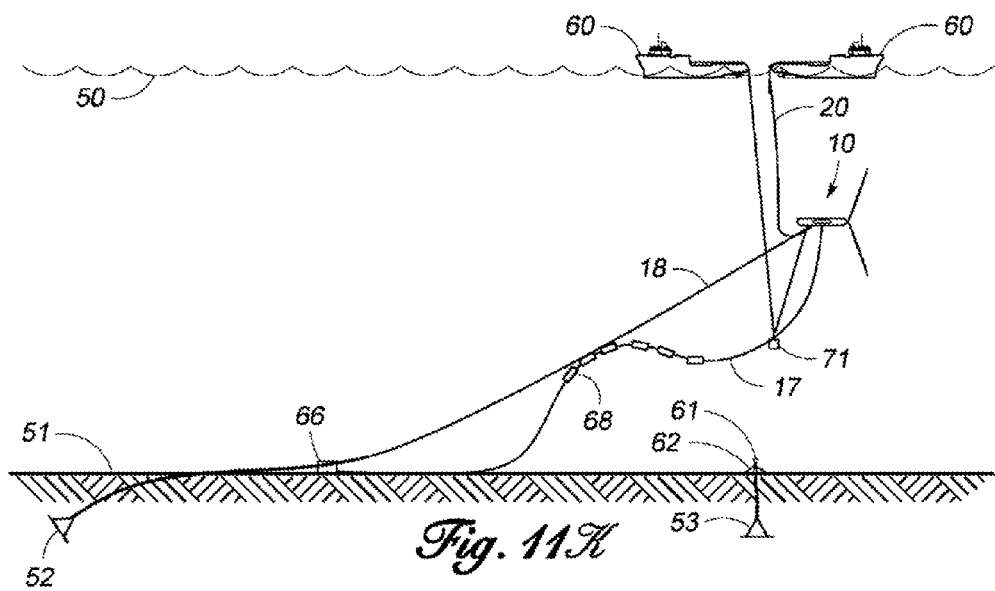
FIG. 11K depicts the process of lowering the platform and installation of the vertical mooring line.
Figure 11L:
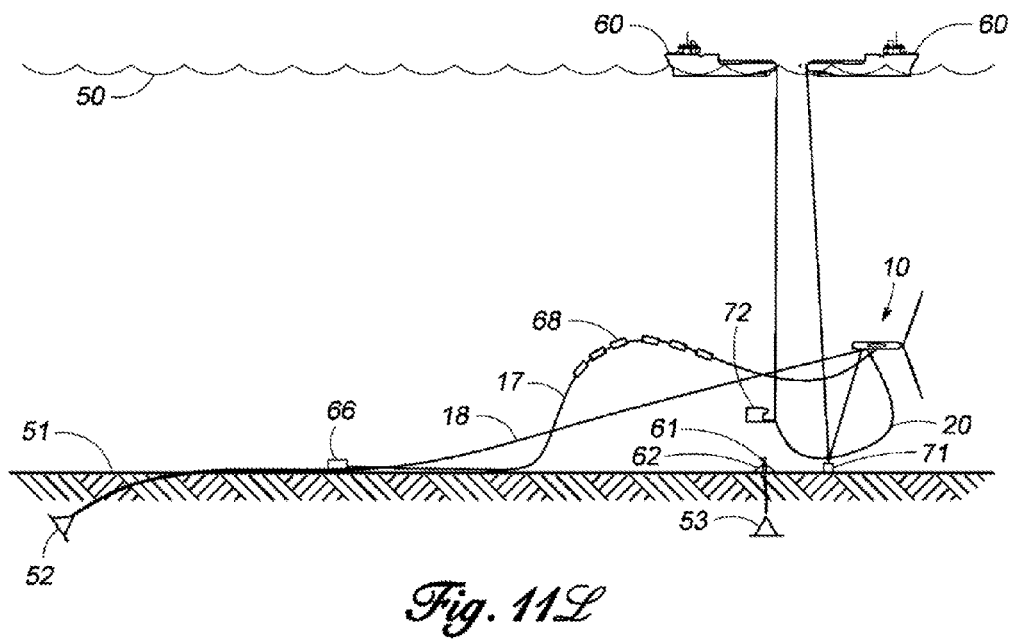
FIG. 11L depicts the connection of the vertical mooring line and ball grab to the mud mat.
Figure 11M:
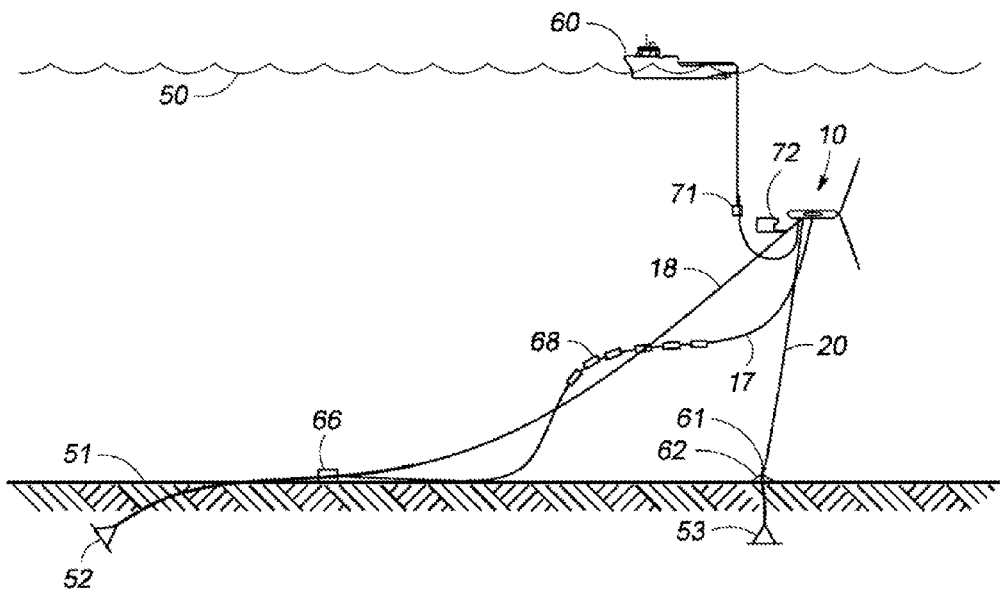
FIG. 11M depicts the retrieval of the lowering weight
Figure 11N:
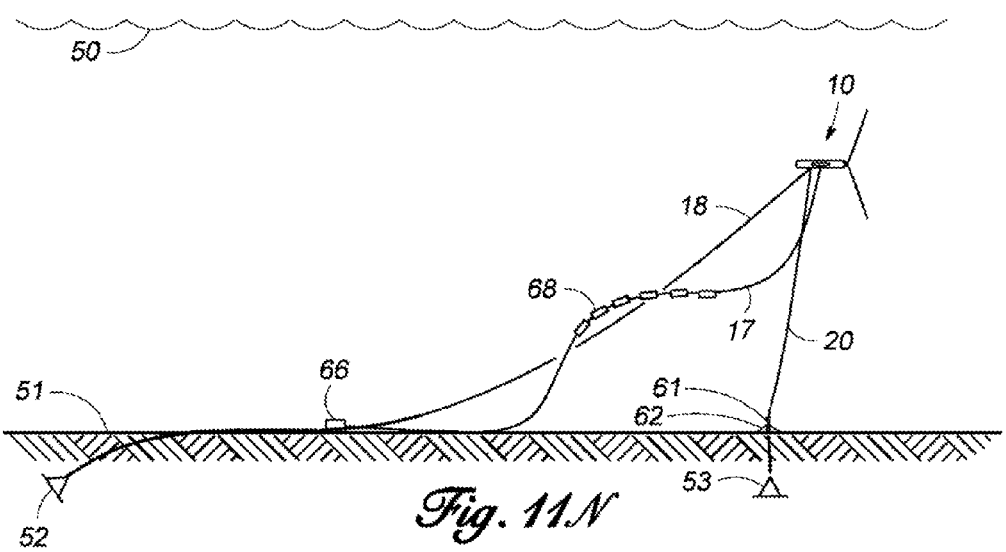

FIGS. 11A through 11N depict the installation steps for a four power pod 11 embodiment of the platform 10. Initially, as shown in FIG. 11A, the forward mooring lines 18 and anchors 52, 53 will be installed at the site by a service vessel 60 and a pull test will be conducted to ensure the anchors 52, 53 are secure. A subsea connector or ball-grab 61 can be pre-attached to a mud-mat 62, which is attached to the anchor 53, to which an end of the vertical mooring line 20 will be attached. As shown in FIG. 11B, the forward mooring lines 18 will be attached to temporary mooring buoys 64 that will keep the lines 18 accessible or just below the water's surface 50. As shown in FIG. 11C, prior to the installation of the platform 10, the power collection cabling lines 65 and subsea junction boxes 66 will be installed at the project site. As shown in FIG. 11D, the intra-array power collection riser cable 17 with subsurface floats 68 will be installed by attachment to temporary surface floats 69. The subsurface floats 68 will ensure reduced structural loads on the power collection riser cable 17, which is non-load bearing. As shown FIG. 11E, the platform 10 will be towed to the test site using a towing bridle 70, which is attached to a service vessel 60. As shown in FIG. F, a service vessel 60 will locate/retrieve the forward mooring lines 18 and temporary mooring buoys 64. As shown in FIG. 11G, a second service vessel 60 will pass them off for attachment to the platform 10. As shown in FIGS. 11H and 11i, the platform 10 will then be reeled in by the towing bridle 70, and the intra-array cable 17, which is buoyed by subsurface floats 68, will be connected to the platform 10. As shown in FIG. 11J, a lowering weight 71 will be winched down to drive the buoyant platform 10 to its operating depth. As seen in FIGS. 11K and 11L, once the lowering weight 71 has reached the seabed 51, the vertical mooring line 20 will be attached to the subsea connector 61 with the assistance of an ROV 72. This subsea connector, or ball-grab 61, by First Subsea Ltd, is attached to a mud mat 62, which is attached to a pre-installed anchor 53. As shown in FIG. 11M, the lowering weight 71 will then be winched up to the water's surface 50, at which point, the platform 10 will be positioned at its maximum operating depth. Following mooring leg inspections the service vessels 60 will then return to port to assist with the installation of other platforms 10.

As indicated supra, using equipment like that shown in FIG. 6, another embodiment of the platform installation process is for vertical mooring line 20 to spool on an on-board winch 27 on the platform 10 and connect to anchor 53 while the platform 10 is on the ocean surface 50. The on-board winch 27 is activated to draw the platform 10 down to its minimum service depth, and there locked until future release for surfacing the platform 10 for servicing. The downward draw by the winch 27 may be assisted with a small amount of added ballast 28.

FIG. 11N shows the platform 10 operating after installation, with the forward mooring lines 18 and the vertical mooring line 20 holding it in place. The electrical connection of the platform 10 to the grid is accomplished through the use of the power collection riser cable 17 that links the platform 10 to a common junction box 55. Each power collection riser cable 17 will be connected to a subsea junction box 66 with the use of a dry splice or a wet mate connector, such as a Mecon, SpecTRON or ODI-Teledyne. The wet mate connector allows for the connection of the intra-array cables 17 to a transmission line 65 (shown in FIG. 11C) that will bring the electricity to shore.

As electricity is generated within the power pods 11, electrical power is transmitted by cable to an onboard transformer. The transformer will raise the voltage of the electricity to a value >33 kV that is more suited to reduce line loss or long distance transmission. From the onboard medium voltage transformer, a power cable from each power pod 11 will be routed to a common point at the center of the wing 12. The individual power cables from each power pod 11 will be joined, and the one intra-array cable 17 will penetrate the wing 12 and travel down to the seafloor 51. At the penetration point of the wing 12 there will be a bend restrictor, such as provided by Trelleborg. The bend restrictor, a combination of polyurethane elements and stainless steel fasteners, is used to prevent bending of the intra-array cable 17 beyond its minimum bend radius at the interface between the flexible and rigid structure. This is done in order to avoid potential failure or fraying of the cable casing from fatigue and wear. If the casing of the cable were to be penetrated or pinched, it could lead to sea water leakage and potential failure of the electrical components.

The onboard transformer, which raises the generator output voltage to over 33kV, allows for the omission of a massive, costly and complex subsea transformer. The addition of a subsea transformer would require amortization of its costs amongst a large number of the platforms 10 in a farm, and preclude economic deployment of a smaller farm. Its elimination benefits the overall system cost of energy and avoids complex subsea O&M tasks and survivability issues that would otherwise be necessary.

Figure 12:
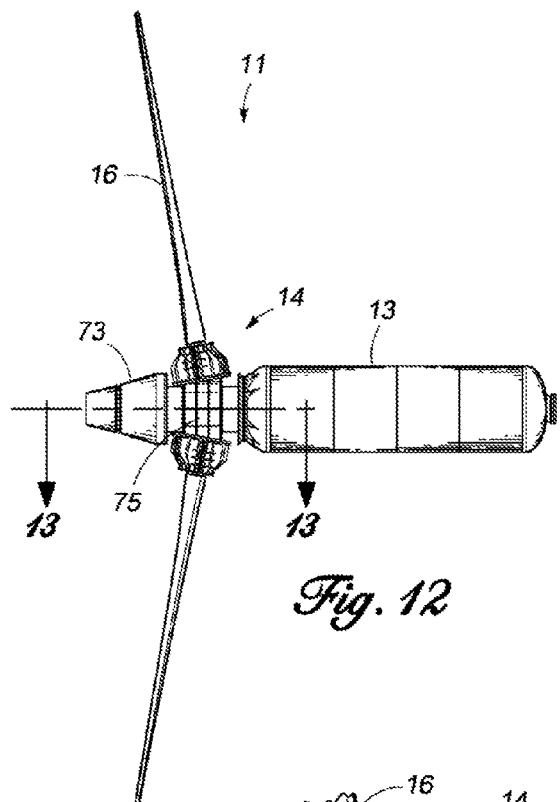
FIG. 12 is a side plan view of an embodiment of the power pod.

FIG. 12 depicts the power pod 11, the main building block of the platform 10. The power pod 11 is composed of several main components: a buoyant pressure vessel 13 and a wet rotor assembly 14 with two fixed pitch rotor blades 16. The pressure vessel 13 itself is a metallic or composite shell having a structure adequate to withstand the pressures at the maximum operating depth. It can be constructed as one continuous welded structure, through casting or using a combination of multiple bolted sections. The pressure vessel 13 is rigidly connected, to the structural wing 12 of FIG. 1 by means of a gusseted steel connection, and is designed to allow at-sea removal and replacement. Equipment within the pressure vessel 13 is located as low as possible to lower its center of gravity. To increase the stability of the platform 10, the power pod 11 is typically affixed to the underside of the buoyant structural wing 12. The wing 12 will provide buoyancy to the system, maximizing the distance between the center of buoyancy of the platform 10 and center of gravity of the platform 10. A buoyant tail cone 73 may be connected at the end of the rotor assembly 14 to add buoyancy to the power plant and stabilize the longitudinal center of gravity.

The power pods and rotor assemblies are designed to operate upstream and downstream; clockwise and counterclockwise thereby resulting in a separate universal product which in addition the use on the platforms shown herein, are also adaptable to a tidal current device, and run-of-river applications.

Figure 13:
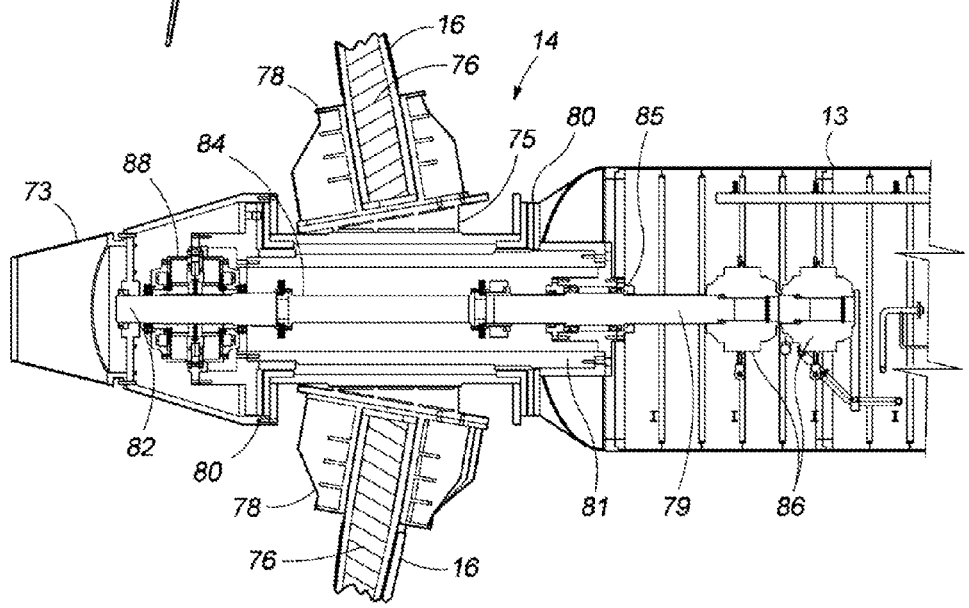
FIG. 13 depicts a section view of the power pod shown in FIG. 12, taken along line 13-13, showing an embodiment of the wet rotor.

In order to maximize efficiency and annual energy production, the rotor blades 16 have been optimally designed to capture the maximum energy from the fluid at the target flow velocity 38. They will be constructed of composite materials such as E-glass and resin, or carbon, if necessary, and they are designed to be structurally robust so that they are capable of withstanding the loads that they will encounter while in service. The rotor blades 16 will be connected to the power pod 11 in one of three methods. The first method is shown in FIG. 13 and utilizes two separate internal blades spars 76 that individually connect to a rotor hub assembly 75 using blade sockets 78. The second method, shown in FIG. 17 infra, involves a continuous internal composite spar 96 that stretches from one blade tip to another and is mounted at its integral hub 91. The third method, which is common with large wind turbines, is a hemispheric-shaped hub with blade root bolts. These blade scenarios, along with the rotor hub, main shaft, and wet bearing and seal package, allow for the torque generated by the rotor blades 16 to be transferred inside the pressure vessel 13 to the drivetrain.

FIG. 13, a section cut through the rotor assembly 14, depicts one option for connecting the rotor blades 16 to the rotor hub 75. At the top and bottom of this figure are the blade spars 76 and the blade sockets 78 that clamp them rigidly in place. These sockets 78 are bolted to the steel rotor hub 75. The rotor hub 75 rotates on a two-part fluidic bearing assembly 80 that is supported by a stationary rotor shaft support 81. (In the second blade scenario shown in FIG. 17, infra, a similar fluidic bearing assembly 90 is used but the rotor blades 16 are attached at the downstream end of the bearing instead of riding on the bearing). In FIG. 13, as the rotor blades 16 spin the rotor hub 75, a torque transmission shaft 82 that is directly coupled and within the interior to the fluidic bearing assembly 80 spins as well. The torque transmission shaft 82 allows for the de-coupling of any non-torque loads that would otherwise be transmitted into the system. This means that any components that follow this drive shaft 79 in the drivetrain will see only torque and no additional loads. Using a diaphragm flex coupling 84, the torque transmission shaft 82 is coupled directly to a drive shaft 79 that penetrates the pressure vessel 13 through a mechanical seal assembly 85 in order to drive a hydraulic pump 86.

Figure 14:
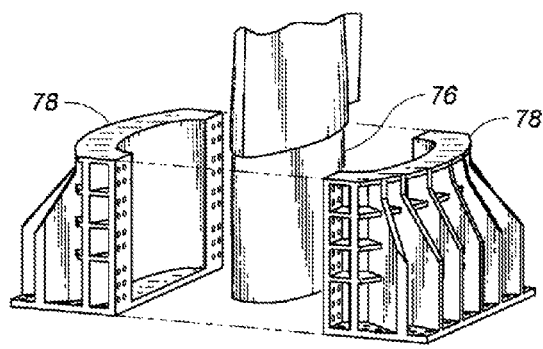
FIG. 14 is an exploded perspective view of the blade socket and internal blade spar.
Figure 15:
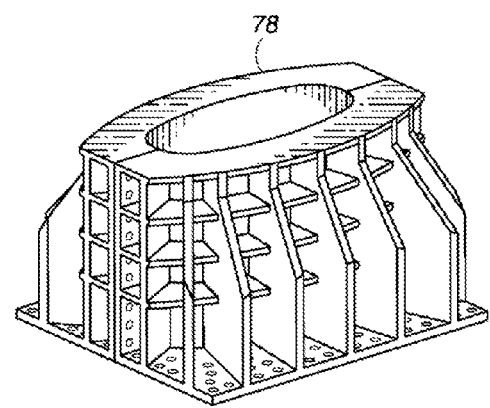
FIG. 15 is a perspective view of the assembled blade socket of FIG. 14.

FIG. 14 is an exploded perspective view of the blade socket 78 and internal blade spar 76, while FIG. 15 is a perspective view of the assembled blade socket 78, which is shown in place in FIG. 13. The internal blade spar 76 is inserted into the female portion of the blade socket 78 so that, as the fluid current drives the rotor blades 16, the torque load created is transmitted into the rotor hub 75. The female portion of the blade socket 78 serves the purpose of fixing the rotor blades 16 in the blade socket 78. The two steel halves of the blade socket 78 are to be bolted together, after which the assembled rotor blade 16 and blade sockets 78 will be bolted to the rotor hub 75.

Figure 16:
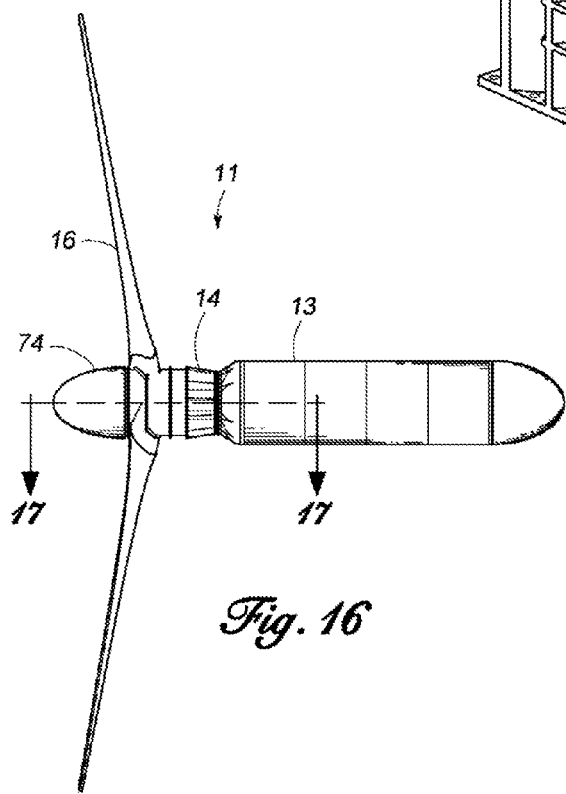
FIG. 16 is a side plan view of another embodiment of the power pod.

FIG. 16 depicts an alternate embodiment of the power pod 11 shown in FIG. 12. The power pod 11 is composed of several main components: a buoyant pressure vessel 13 and a wet rotor assembly 14, with two fixed pitch rotor blades 16. It is constructed in much the same manner as the power pod shown in FIG. 12, supra. A buoyant tail cone 74 may be connected at the end of the rotor 14 to add buoyancy to the power pod.

Figure 17:
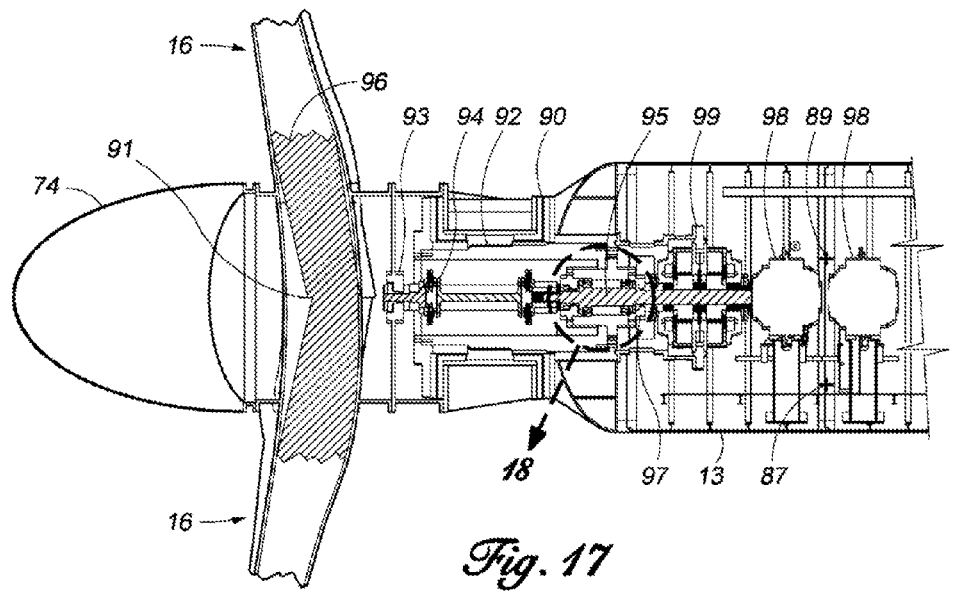
FIG. 17 depicts a section view of the power pod shown in FIG. 16, taken along line 17-17, showing a second embodiment of the wet rotor assembly.

FIG. 17 is a section view of the pressure vessel 13 shown in FIG. 16. This embodiment of the rotor has a continuous internal spar 96, spanning both rotor blades 16, that transmits the torque from the rotor assembly to the drive shaft 95. This configuration weighs much less than the configuration shown in FIGS. 12 and 13, due to the absence of the steel blade sockets 78 and the heavy structural rotor hub 76 as shown in FIG. 17, the continuous blade spar 96 and hub 91 combination, made of composite material, is mounted to wet bearing assembly 90. In this configuration, the wet brake 88 of FIG. 13 has been moved inside the pressure vessel 13. In both configurations, the brake is located as close as possible to the rotor assembly 14 so that, when applied, the balance of the drivetrain is better protected from dynamic events imposed by the rotor assembly 14. Its interior location gives it the advantage of not having to be watertight and allows for maintenance on the dry brake 99 from within the power pod 11. When compared to the dry brake 99, the wet brake 88 of FIG. 13 is susceptible to leakage and corrosion from the seawater. The location of the brake within the pressure vessel 13 in FIG. 17 improves the stability of the platform 10 because it allows for the center of weight 87 to be shifted forward, closer to the center of buoyancy 89. This will help to reduce the moment created by the brake 99 if it were located aft of the rotor blades 16. The brake 99, potentially a Wichita or Twinflex product, is spring-applied and hydraulically-released. In the event of a hydraulic power failure, the brake 99 will automatically apply.

The diaphragm flex coupling 94 shown in FIG. 17 is required in the system to compensate for radial and axial bearing wear. Over its lifetime, the rotor assembly 14 will shift in position as the bearings 90 wear. To compensate for this wear, each end of the torque transmission shaft 93 is equipped with a stainless steel Ameriflex diaphragm shaft flex coupling 94. The diaphragms are separated to eliminate wear in the flexed area.

Figure 18:
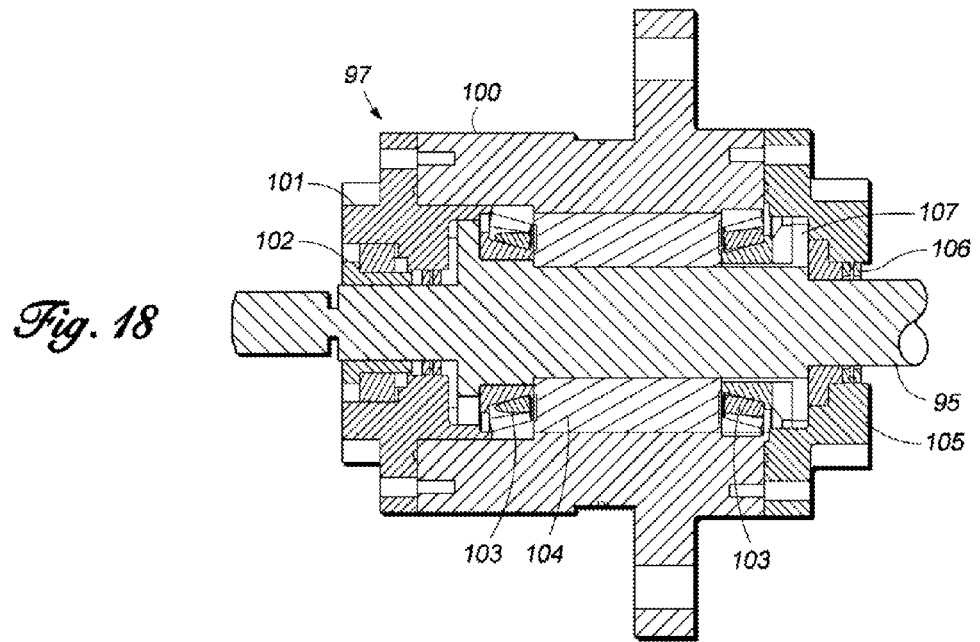
FIG. 18 is a detailed section view of the mechanical seal assembly shown in FIG. 17.

FIG. 18 depicts an enlarged view of the mechanical seal assembly 97 from FIG. 17. The mechanical seal assembly 97 is the boundary between the exterior environment and the inside of the pressure vessel 13. The design of the total bearing and seal package allows for the use of a smaller drive shaft 95 and therefore a smaller penetration of the pressure vessel 13. The de-coupling of the non-torque loads at the rotor hub 91 as a result of the seawater-film bearing assembly 90 allows for a smaller drive shaft 95 that does not feel the total torque and thrust loads from the rotor assembly.

The mechanical seal assembly 97 is composed of several steel housing components along with roller bearings and seals. The main bearing housing 100 is bolted to the end cap of the pressure vessel 13. On the seawater side of the assembly is a seawater seal housing 101 that contains a mechanical face seal 102 to keep seawater out. Two tapered roller bearings 103 are located inside the main bearing housing 100 to keep the drive shaft 95 centrally located and aligned within the seal 102. A steel bearing spacer 104 will be machined to keep the tapered roller bearings 103 in place and assist with the alignment of the drive shaft 95. On the inside of the pressure vessel 13, the oil-seal housing 105 will keep oil inside of the assembly 97. Two oil seals 106 with wear sleeves will be included in the assembly 97 to ensure proper sealing between the drive shaft 95 and the assembly 97. A locknut 107 will be installed at the forward end of the drive shaft 95 to hold its position. The drive shaft 95 will be splined at its end for mounting of the hydraulic pump 98.

Figure 19:
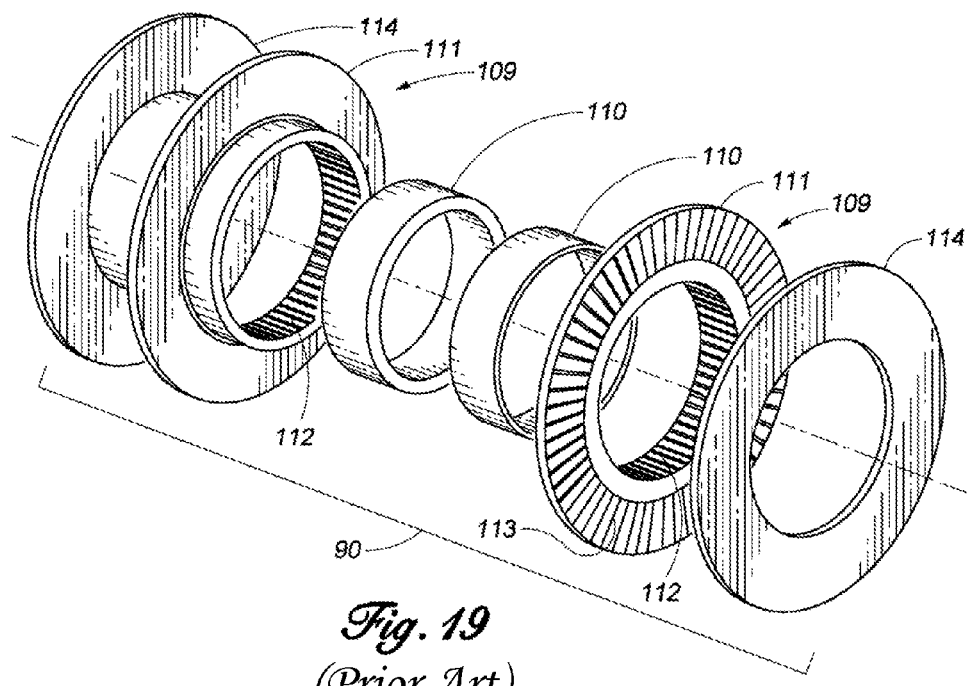
FIG. 19 is an exploded perspective view of the components of the seawater film bearing assembly.

FIG. 19 shows an exploded view of the components of seawater-film bearing assembly 90, a set of hydrodynamic bearings 109 that operates when submerged in seawater. Bearings of this size are common in Navy and commercial vessels and require a copper-nickel runner coating. The hydrodynamic bearings 109 will be mounted to the stationary rotor support 92, as shown in FIG. 17, and will be symmetrical about the centerline of the bearing assembly 90. Each end of the bearing assembly 90 will consist of a stationary radial runner 110, one forward and one aft, that will sit in place on the rotor support 92. A solid dovetailed flange housing 111 will rotate around each of the radial runners 110. The inner diameter of the stainless steel flange housings 111 will be lined with elasto-hydrodynamic lubrication (EHL) such as Duramax OMX radial staves 112 that will ride on the radial runners 110. The thrust face of the flange housings 111 will be lined with Duramax OMX thrust pads 113. The thrust pads 113 will ride along a stationary thrust runner 114 that will be located at each end of the seawater-film bearing assembly 90.

Figure 20:
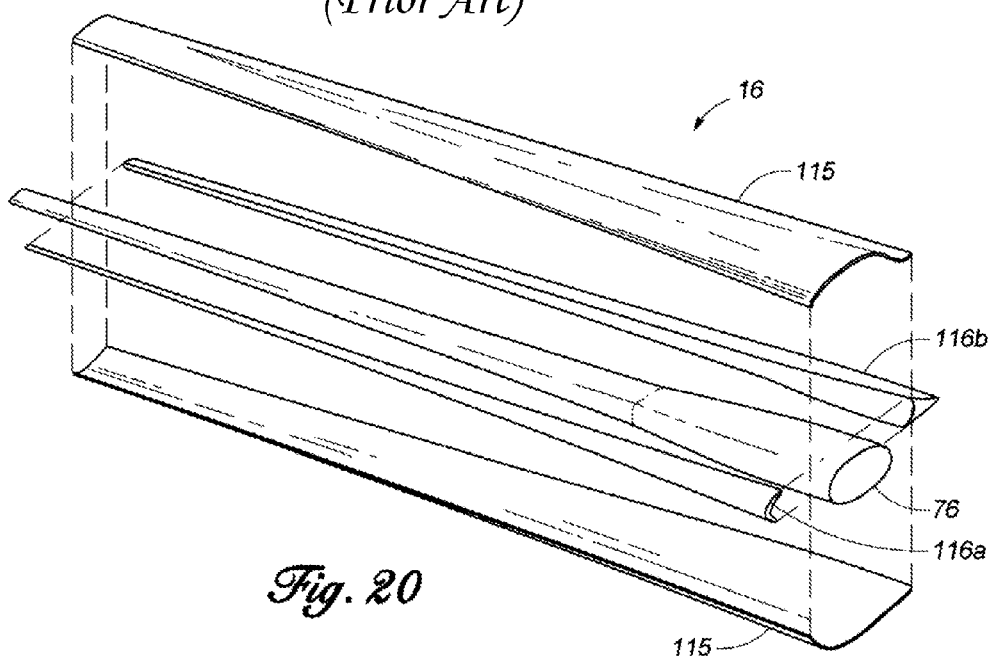
FIG. 20 is an exploded perspective view of the components that make up a rotor blade.

As seen in FIG. 20, the rotor blades 16 have an internal spar 76 that is encased within composite shells 115 that form the surfaces of the rotor blade 16. The space between the internal blade spars 76 and the blade shells 115 is intended to be filled with syntactic foam 116*a*, 116*b*, or similar foam, that will add buoyancy to the rotor blades 16, reducing their weight in water and the moment that will be felt by the rotor hubs 75. The foam will also serve the purpose of preserving the internal blade components in a corrosive environment. The core of the internal blade spar 76 may also contain foam, if necessary, in order to reduce the overall weight in water of the rotor blade 16.

Figure 21:
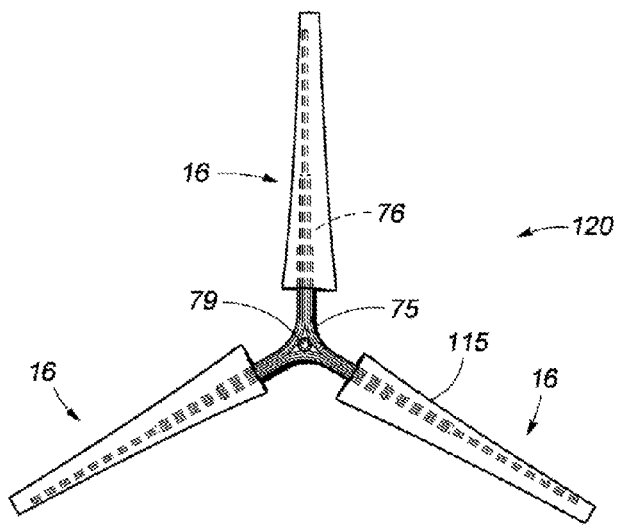
FIG. 21 is a plan view of an embodiment of a three-bladed integration of the rotor hub with blade to blade spanning spars.

FIG. 21 shows a three-bladed variant 120 of the two-bladed continuous internal spar 76 concept. The internal spars 76 are formed as individual members that are bonded together in such a way that each internal spar 76 is shared by two adjacent rotor blades 16. Multiple spars can be stacked until a desired strength is achieved. Forming the spars individually allows for the accommodation of the rake, pitch, and twist of each blade. Once the spars have been fabricated, blade shells 115 are attached. This three-blade configuration 120 can be expanded to employ a larger number of blades ("N"). The goal, similar to that of the two-bladed configuration is to react the moments created by the thrust loads at the center of the hub 75.

Figure 22:
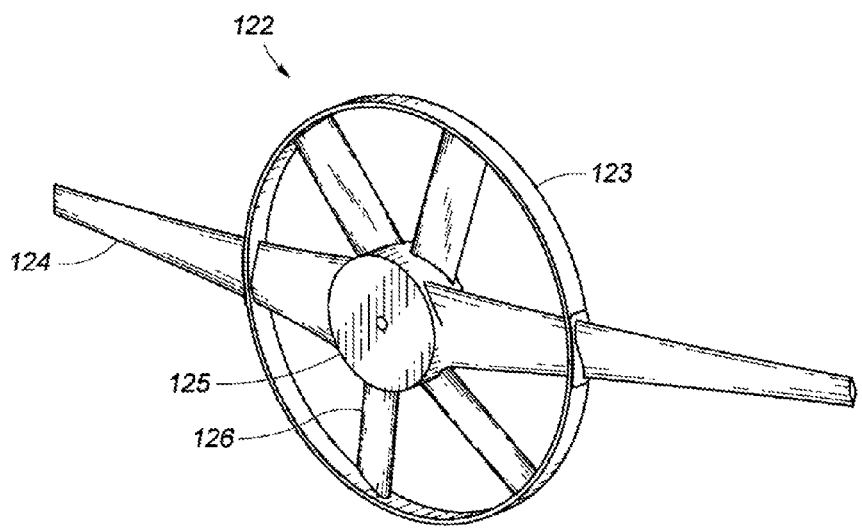
FIG. 22 is a perspective view of an alternate rotor blade configuration in which a structural outer hub and outer blades encircle a smaller inner hub and a set of inner blades.

FIG. 22 shows another blade configuration, a ring configuration 122, in which a structural outer hub 123 and outer blades 124 surround a smaller inner hub 125 and an additional set of inner blades 126. This configuration will be built in several pieces. The inner hub 125 and inner blades 126 are built as one assembly, which incorporate the internal blade spars (76). In the case where the inner blades 126 align with the outer blades 124, it is important that the blade spar (76) be built as one continuous member that starts at the inner rotor hub 125 and extends to the tip of the outer blades 124. The outer hub 123 is bolted to the tips of the inner blades 126. Where the outer blades 124 align with the inner blades 126, the outer hub 123 must allow for the internal blade spar (76) to extend into the outer blades 126. In a case with only two large outer blades 124 and a single central hub 125, the moment encountered at the root of each blade 124 is very large. These large loads require a large structural hub 125 to react these loads. A large hub means more material and, in turn, high costs. The structure of FIG. 22 utilizes an outer hub 123 to evenly distribute the moments created by the current thrust loads on the outer blades 124 amongst the inner blades 126. If the total moment is divided between "N" inner blades 126, each blade will encounter a smaller load. These smaller loads require less material inside the inner hub 125, reducing both weight and cost.

Figure 23:
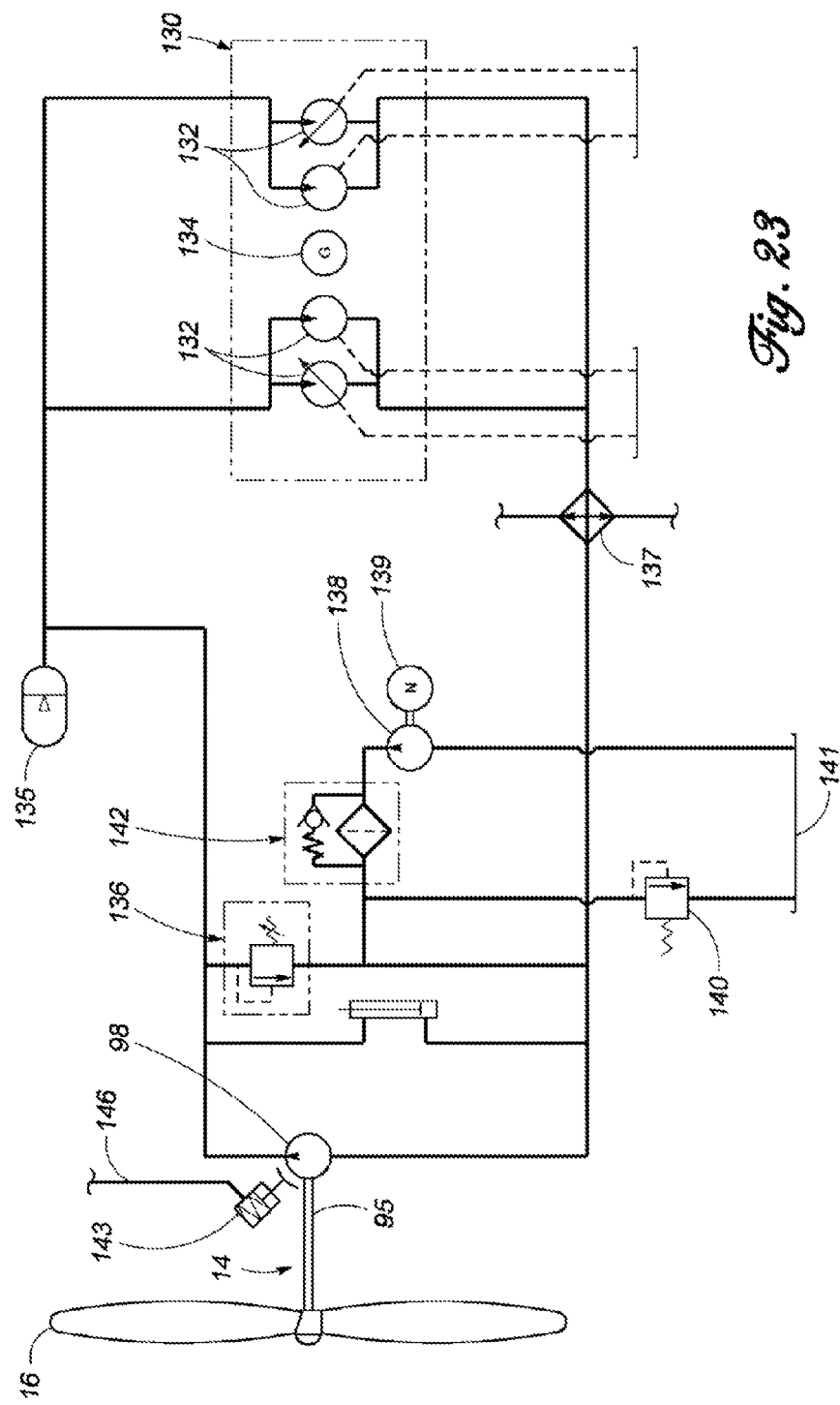
FIG. 23 is a schematic of the drivetrain hydraulic circuit.
Figure 25:
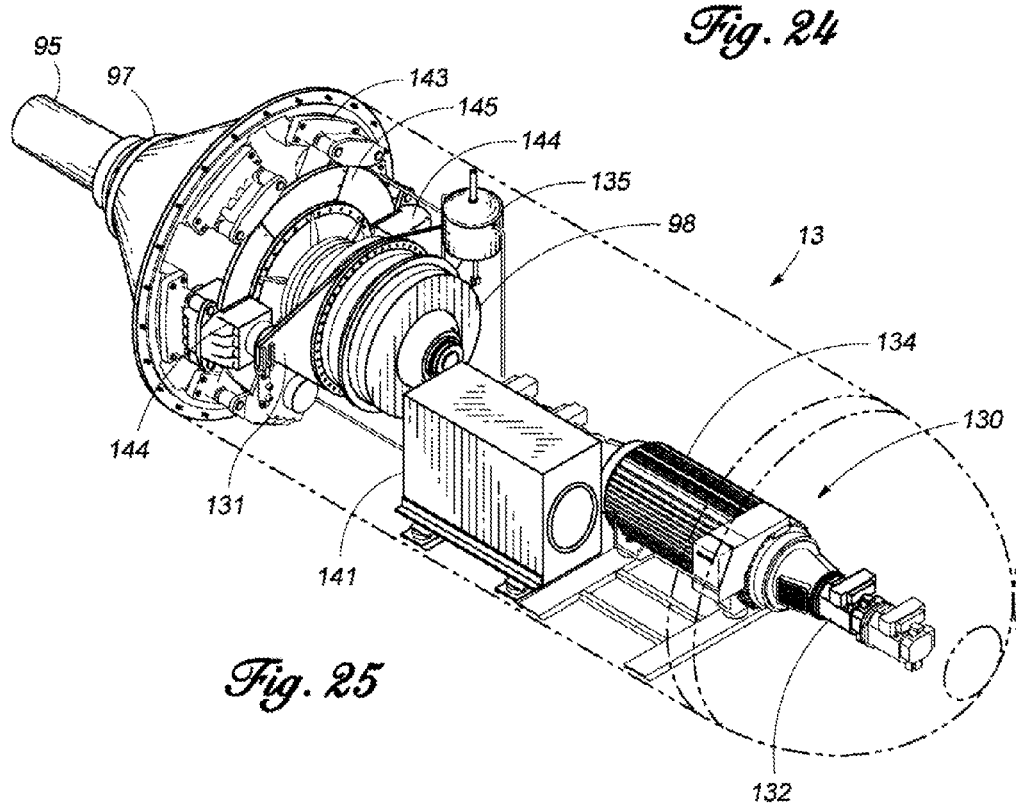
FIG. 25 is a perspective cutaway view of the interior components of the pressure vessel.

Within each pressure vessel 13 is an independent hydraulic drivetrain that powers a hydraulic motor generator (HMG) 130. FIG. 23 is a schematic of the hydraulic transmission. FIG. 25 shows many of the elements in a cutaway view. The conversion of the energy starts with the rotor assembly (14). These components convert the energy in the current flow to rotary motion at the drive shaft 95.

The drive shaft 95 is the input for the hydraulic pump 98 that is mounted on the inside of the pressure vessel 13.

The hydraulic system is currently designed for a single or combination of Hagglunds family series CBM2000, CBM4000, and CBM6000 fixed-displacement, radial-piston type hydraulic pumps 98, which deliver flow of hydraulic oil in proportion to the rotor assembly 14 speed. The hydraulic fluid is delivered to the hydraulic motor sets 132 that power the constant speed synchronous generator 134. These components make up the HMG 130. The hydraulic motor sets 132 are a combination of a fixed and a variable displacement motors for high efficiency. The variable displacement hydraulic motor is regulated to maintain constant speed when supplied with a variable flow, and the fixed displacement motor has a fixed flow requirement for a given speed. To control fluctuations in pump flow resulting from speed changes and flow pulses from the pump pistons, a gas-charged accumulator 135 has been included. A system relief valve 136 provides system over-pressure protection to avoid damaging downstream components in the event of a system malfunction.

Once the hydraulic fluid has passed through the HMG 130, a heat exchanger 137, such as a keel cooler, will remove heat generated in the system and transfer it to the body of water surrounding the pressure vessel 13. To provide a positive (above ambient) pressure to the pump inlet port, eliminate cavitation and inhibit wear within the hydraulic pump 98, a charge pump 138 and motor 139 are installed on the low-pressure side of the hydraulic pump 98. A charge pump relief valve 140 is in place to regulate the charge system pressure. The charge pump 138 will draw hydraulic fluid from the hydraulic reservoir 141, a 400 gallon hydraulic oil tank, to feed the system. A filter assembly 142, operating as a "kidney loop, is in place to remove contaminants and moisture from the hydraulic fluid. The hydraulic reservoir 141 increases the volume of oil in the system and the recirculating charge pump 138 and motor 139 combination and filter assembly 142 recirculate and clean the oil in the reservoir 141, thereby cooling the oil and maintaining the oil temperature low enough for proper oil viscosity and service life of the system.

In the event of scheduled system maintenance, the rotor assembly 14 will need to be stopped. Braking of the system is accomplished in one of two ways. As shown in FIG. 25, the first system is a hydraulic-mechanical brake 143. This "fail-safe" brake, which is spring-applied and hydraulically-released, consists of a series of brake calipers 144 acting on a large diameter brake disc 145 that is mounted on the drive shaft 95. When the brake 143 is engaged, the brake calipers 144 clamp down on the brake disc 145 to stop the drive shaft 95 and the rotor assembly 14 from spinning. The second system is a hydraulic brake that utilizes controls and commands within the hydraulic system to stop the hydraulic pump 98 and, as a result, the drive shaft 95 and rotor assembly 14.

Figure 24:
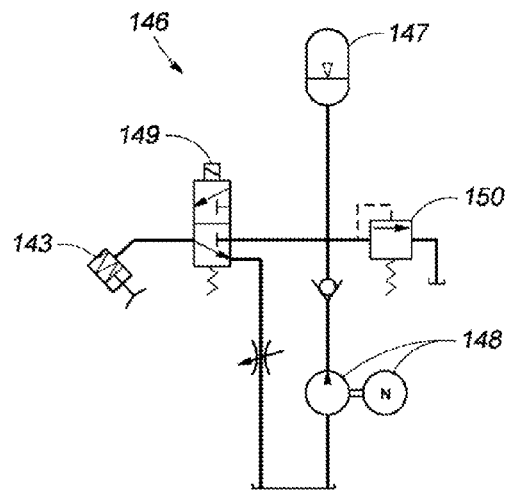
FIG. 24 is a schematic of the brake release circuit.

FIG. 24 is a diagram of the brake release circuit 146 for the hydraulic-mechanical brake 143. This circuit is a takeoff from the main hydraulic loop. The circuit has a charged accumulator 147 that discharges when needed to release the hydro-mechanical brake 143. The accumulator 147 is charged by a brake release pump and motor 148. A solenoid valve 149 is used for activation of the brake release circuit 146. The pressure relief valve 150 is in place to allow for the system to bleed excess pressure in the event of a component failure. Brake release circuitry controls the hydro-mechanical brake 143 as required, during operation and for shutdown for maintenance intervals. The application of this brake 143 can also be completed as a wet brake that would be external to the pressure vessel 13.

As described in FIG. 23 supra, FIG. 25 shows the primary components of the hydraulic drivetrain as they could be arranged within the pressure vessel 13 of a power pod 11. For simplicity, the rotor assembly 14 and rotor blades 16 have been removed from this view. The loads that are encountered by the hydraulic pump 98 are transferred into the body of the pressure vessel 13 by means of a resiliently mounted torque arm 131.

Figure 26:
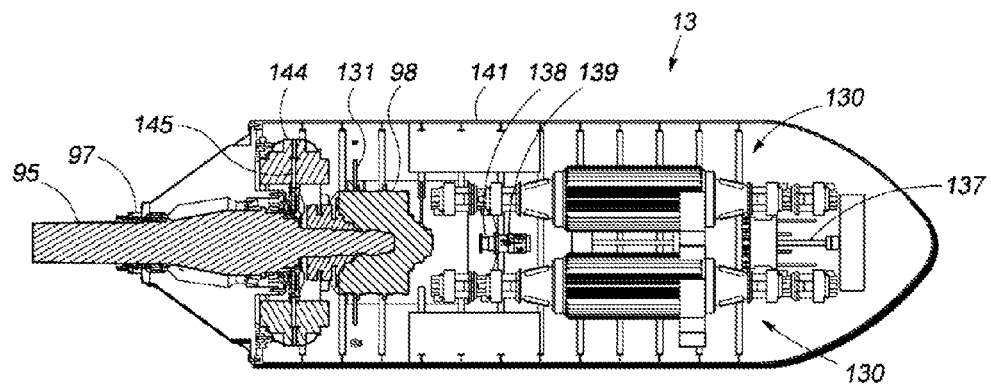
FIG. 26 is a section view of a pressure vessel, showing the pump with two HMG's.
Figure 27:
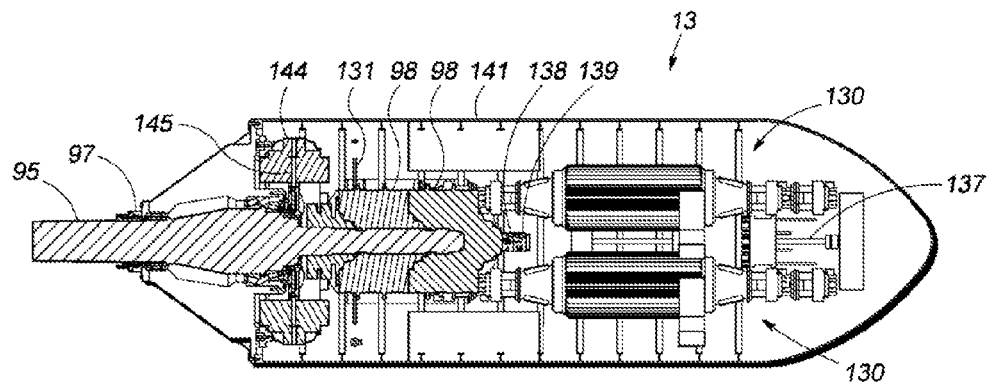
FIG. 27 is a section view of a pressure vessel, showing tandem mounted pumps with two HMG's.

In order to allow for expansion or growth of the system, the option to add an additional HMG 130 or an additional tandem-mounted hydraulic pump 98 is available. FIGS. 26 and 27 depict these arrangements. Having multiple hydraulic pumps 98 or HMG's 130 would allow for greater power production within a single power pod 11.

The high volumetric power density of hydraulics allows this expandability in power production by adding additional pumps in parallel on the main shaft as well as decoupled modular HMG sets. The decoupled power generation of HMGs also assists in Naval architecture requirements of weight and trim by placement of devices low in the power pod improving hydrostatics via increased separation between center or buoyancy and center of gravity improving static stability of the platform.

Figure 28:
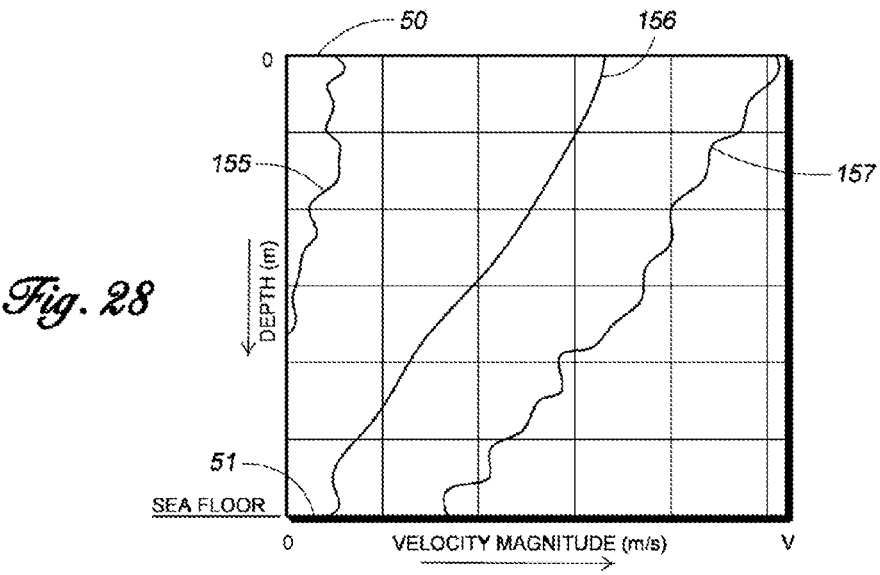
FIG. 28 depicts the velocity distribution in a typical current.

FIG. 28 depicts the velocity distribution in a typical current. The plot shows three contours representing the minimum velocity magnitude 155, average velocity magnitude 156, and maximum velocity magnitude 157. All three values are plotted as a function of water depth in meters (m) on the vertical y-axis and velocity magnitude in meters per second (m/s) on the horizontal x-axis. This graph is helpful in selecting a design speed (v) at a specific depth. Once a target depth has been selected, it is best to optimize the device for the average velocity magnitude seen 156 at that depth. This particular graph shows that it would be best for power production for the device to operate closer to the ocean surface 50, where the average velocity magnitude is highest.

Figure 29:
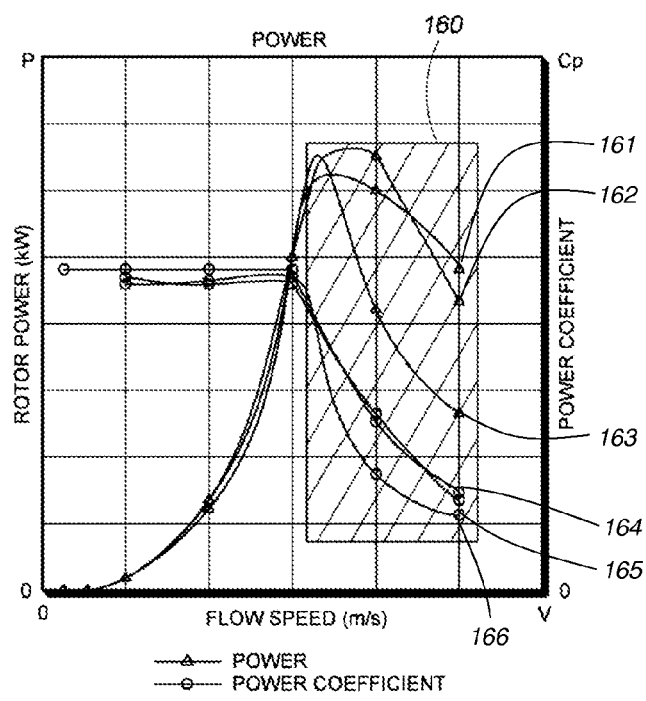
FIG. 29 is an example of a power curve for a single drivetrain.

FIG. 29 is an example of a power curve for a single drivetrain. This graph depicts the power that is capable of being extracted from the selected current by the rotor assemblies, utilizing different computational fluid dynamics (CFD) models. The graph compares the power extraction in kilowatts (kW) on the x-axis as a function of current flow speed in meters per second (m/s) on the y-axis. The device utilizes the wing 12 to avoid the non-linearities in the post-stall region 160. Each power curve represents different turbulence model:

a. 161 - Power (CFD q-w)
    b. 162 - Power (CFD q-w-Mentor)
    c. 163 - Power (CFD S-A)
    d. 164 - Power Coefficient (CFD q-w)
    e. 165 - Power Coefficient (CFD q-w-Mentor)
    f. 166 - Power Coefficient (CFD S-A)

Turbulence models are settings within a computational fluid dynamics (CFD) code that specify equations and computational methods used to model the effects of turbulence within the flow. Coakley model (q-w) is a variation of the popular k-epsilon or k-omega models where $g=k\Lambda 1/2$, and omega=e/k. Coakley-Mentor model (q-w-Mentor) is a model that utilizes Menter's Shear Stress Transport model to transition from the one turbulence model in the inner boundary layer region to another in the free sear flow. Spalart-Allmaras model (S-A) employs a Boussinesq hypothesis that offers a relatively low cost computation for the turbulence viscosity. This graph is to communicate the unpredictability of post stall behavior using SOA CFD codes. The inflection points drive to passive depth control as a means of load shedding versus stall regulation, which is further compounded by a high Reynold's number.

We claim:

1. A method of controlling depth of a buoyant submersible apparatus in a fluid flow, the method comprising the following steps:

positioning, deploying, setting, and performing a pull test on at least one forward mooring line anchor and one vertical mooring line anchor;

attaching a mud mat and a releasable subsea connector to the one vertical mooring line anchor;

attaching a temporary surface buoy to an end of at least one forward mooring line, the at least one forward mooring line attached to the at least one forward mooring line anchor;

towing the buoyant submersible apparatus to a position on an ocean surface above the anchors;

removing the temporary surface buoy from the end of the at least one forward mooring line and attaching the forward mooring line to a connection point on the buoyant submersible apparatus;

attaching a first end of a vertical mooring line to a second connection point on the buoyant submersible apparatus;

using a weight to submerge the buoyant submersible apparatus to an operating depth below the ocean surface;

attaching a second end of the vertical mooring line to the subsea connector, the vertical mooring line having a length calculated to restrict a distance to the surface of the buoyant submersible apparatus in the fluid flow; and raising the weight to the ocean surface, so that the buoyant submersible apparatus rises.

2. The method of claim 1 which further comprises:
bringing the buoyant submersible apparatus to the ocean surface by releasing the second end of the vertical mooring line from the subsea connector.

3. The method of claim 1, wherein the second connection point on the buoyant submersible apparatus to which the first end of the vertical mooring line is attached is an onboard winch that can be used to draw in or let out the vertical mooring line for raising and lowering the buoyant submersible apparatus.

4. The method of claim 3, wherein the buoyant submersible apparatus further comprises a ballasting system to facilitate submerging the apparatus during installation and maintenance operations.

5. The method of claim 1, wherein the buoyant submersible apparatus is a platform including power pods containing electric generators and wherein the method further comprises:

installing a power riser cable onto the platform; and
connecting the power riser cable to the generators within the power pods; the power pods thereafter generating electricity from the fluid flow and transmitting the generated electricity to a shore-based substation of a power grid.

6. The method of claim 5, wherein torque produced by each of the power pods is utilized to counterbalance other structural loads.

* * * * *